(12) United States Patent
Sullender

(10) Patent No.: US 8,340,421 B2
(45) Date of Patent: Dec. 25, 2012

(54) THREE-DIMENSIONAL SYSTEM AND METHOD FOR CONNECTION COMPONENT LABELING

(75) Inventor: Craig Sullender, Austin, TX (US)

(73) Assignee: EYEP Inc., Austin, TX (US)

( * ) Notice: Subject to any disclaimer, the term of this patent is extended or adjusted under 35 U.S.C. 154(b) by 1218 days.

(21) Appl. No.: 12/058,706

(22) Filed: Mar. 30, 2008

(65) Prior Publication Data

US 2009/0196508 A1 Aug. 6, 2009

Related U.S. Application Data

(63) Continuation-in-part of application No. 12/025,738, filed on Feb. 4, 2008, and a continuation-in-part of application No. 12/028,146, filed on Feb. 8, 2008, and a continuation-in-part of application No. 12/030,003, filed on Feb. 12, 2008, and a continuation-in-part of application No. 12/046,464, filed on Mar. 12, 2008.

(51) Int. Cl.
*G06K 9/34* (2006.01)

(52) U.S. Cl. ........................ 382/173; 382/180

(58) Field of Classification Search ................ 382/173, 382/180, 203
See application file for complete search history.

(56) References Cited

U.S. PATENT DOCUMENTS

| | | | |
|---|---|---|---|
| 4,751,643 A * | 6/1988 | Lorensen et al. ............ 382/132 |
| 4,791,676 A | 12/1988 | Flickner et al. | |
| 4,847,786 A * | 7/1989 | Wang et al. ................... 382/171 |
| 4,991,224 A * | 2/1991 | Takahashi et al. ............ 382/180 |
| 7,251,355 B2 * | 7/2007 | Nishide ......................... 382/154 |
| 7,298,899 B2 | 11/2007 | Koide et al. | |
| 2006/0104513 A1 | 5/2006 | Aharon et al. | |

FOREIGN PATENT DOCUMENTS

| | | |
|---|---|---|
| WO | WO2006083236 A1 | 8/2006 |
| WO | WO2006109250 A2 | 10/2006 |

OTHER PUBLICATIONS

Dinstein, I. et al., "Handling Memory Overflow in Connected Component Labeling Application", IIEE Transactions on Pattern Analysis and Machine Intelligence. Jan. 1985, vol. PAMI-7, No. 1, pp. 116-121.
Buvry, et al., "A Rule-Based System for Region Segmentation Improvement in Stereovision", ENSEEIHT-IRIT-UA 1399 CNRS, 11 pages.
Chang, et al., "A Linear-Time Component-Labeling Algorithm Using Contour Tracing Technique", Institute of Information Science, Academia Sinica, Taiwan, pp. 1-20.

(Continued)

*Primary Examiner* — Phuoc Tran
(74) *Attorney, Agent, or Firm* — Michael A. Ervin; M. A. Ervin & Associates

(57) ABSTRACT

Embodiments disclosed include methods and systems for three dimensional connected component labeling, including determining a location value for each of one or more labels, each location value identifying a maximum "y" extent and a maximum "z" extent of an associated label region; storing each of the one or more labels that refer to areas subsumed in a determination of the maximum y extent in the maximum "z" extent as a yzMax location value; buffering in a frame buffer the one or more of labels; and providing access via a three-dimensional kernel to one or more values in a current line buffer and/or a current array and/or a previous array.

20 Claims, 35 Drawing Sheets

OTHER PUBLICATIONS

Dillencourt, et al., "A General Approach to Connected-Component Labeling for Arbitrary Image Representations", Journal of the Association for Computing Machinery, vol. 39, No. 2, Apr. 1992, pp. 253-280.

Felzenszwalb, et al., "Efficiently Computing a Good Segmentation", Computer Science Department, Cornell University, pp. 1-31.

Greinder, "A Comparison of Parallel Algorithms for Connected Components", Carnegie Mellon University, 10 pages.

He, et al., "A Run-Based Two-Scan Labeling Algorithm", ICIAR 2007, LNCS 4633, pp. 131-142, 2007.

Hoover, et al., "An Experimental Comparison of Range Image Segmentation Algorithms", IEEE Transactions on Pattern Analysis and Machine Intelligence, vol. 18, No. 7, Jul. 1996, pp. 673-689.

Mirmehdi, "Segmentation of Color Textures", IEEE Transactions on Pattern Analysis and Machine Intelligence, vol. 22, No. 2, Feb. 2000, pp. 142-159.

Rasquinha, et al., "C3L: A Chip for Connected Component Labeling", 10th International Conference on VLSI Design—Jan. 1997, pp. 446-450.

Shima, et al., "A High Speed Algorithm for Propagation-type Labeling based on Block Sorting on Runs in Binary Images", IEEE 1990, pp. 655-658.

Skarbek, et al., "Colour Image Segmentation—A Survey-", Technisher Bericht 94-32, Technische Universitat Berlin, Germany, Oct. 1994, 81 pages.

Tsin, et al., "Bayesian Color Constancy for Outdoor Object Recognition", Proceedings of the IEEE 2001 Conference on Computer Vision and Pattern Recogniton, pp. 1-8.

Wan, Shu-Yen, et. at., "Symmetric Region Growing", IIEE Transactions on Image Processing, vol. 12, No. 9, Sep. 2003.

* cited by examiner

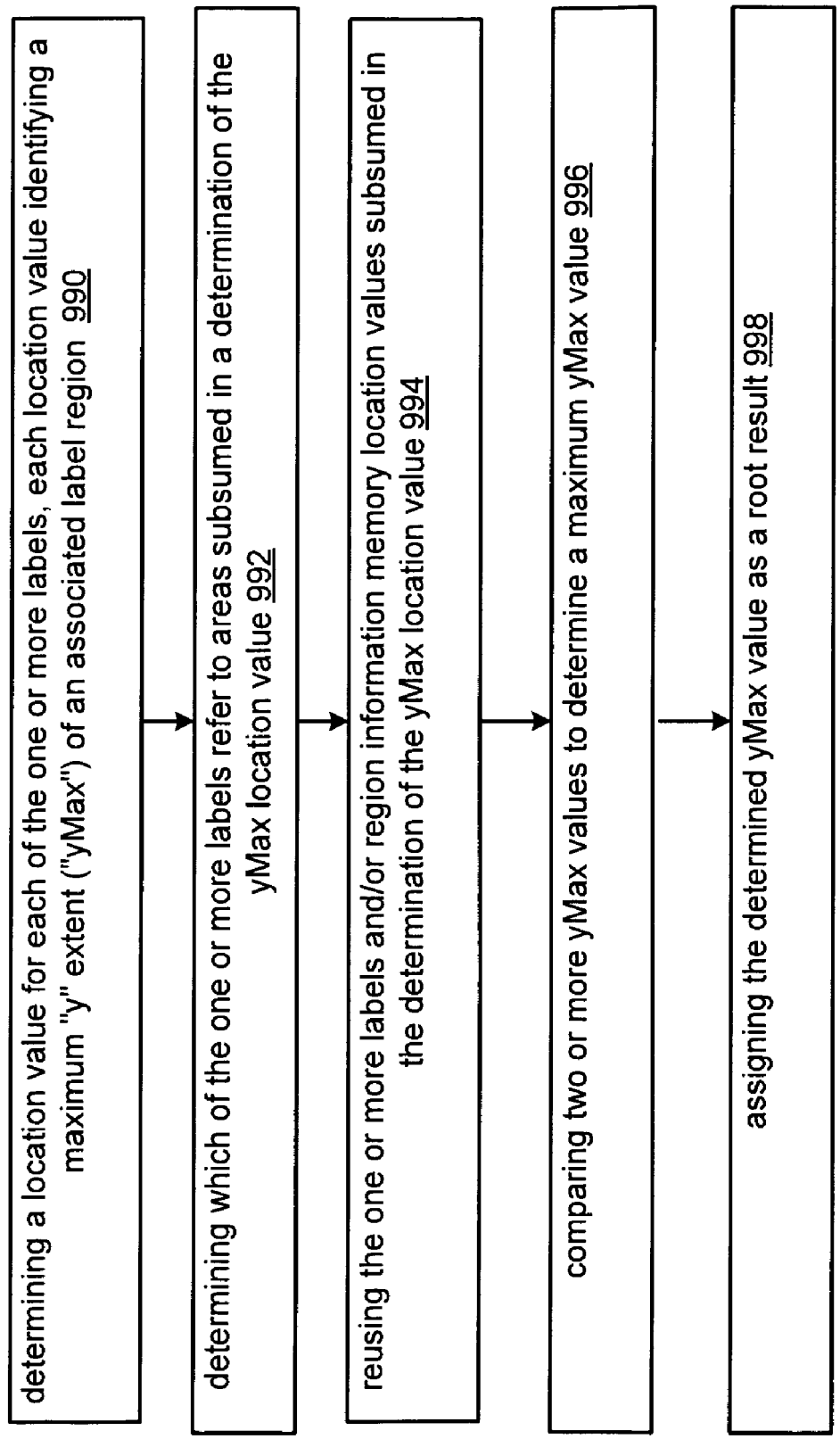

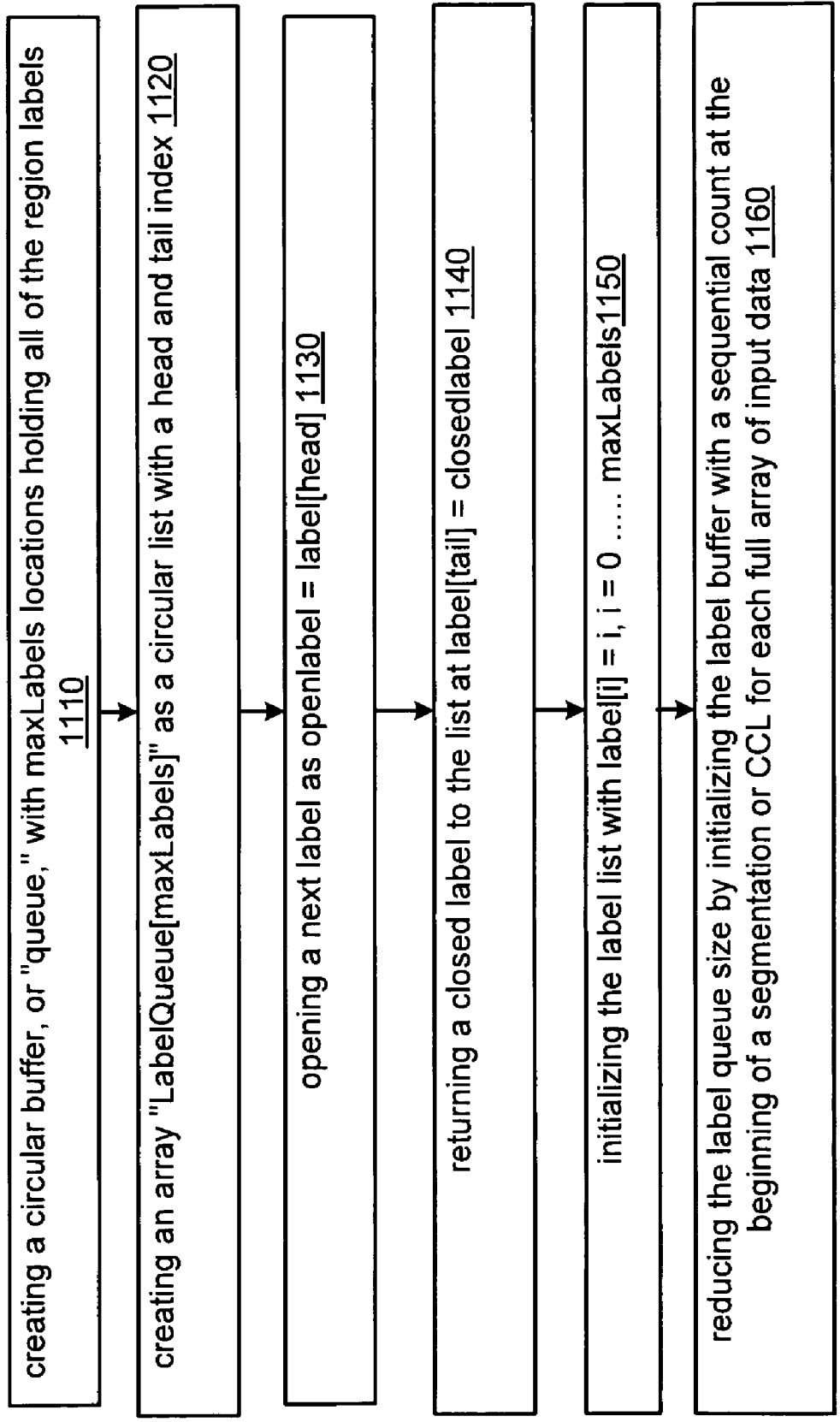

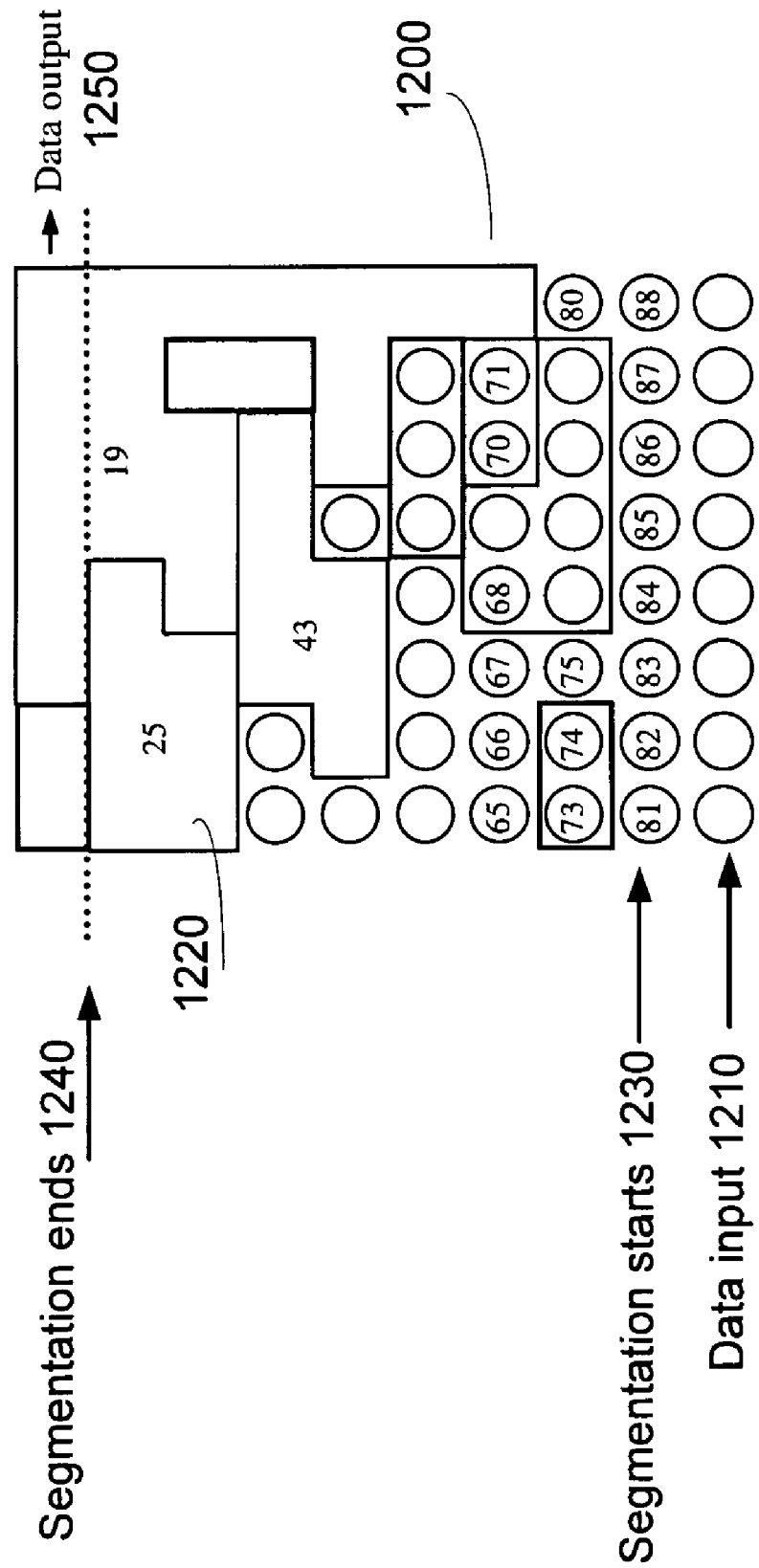

relabeling segmented data 1310 representing data that is known to be connected because of some discernable quality or because it has been labeled and the roots are known by overlapping line segments 1320 operating on line segments from two lines 1330

Previous line 1420
Current line 1410

1400

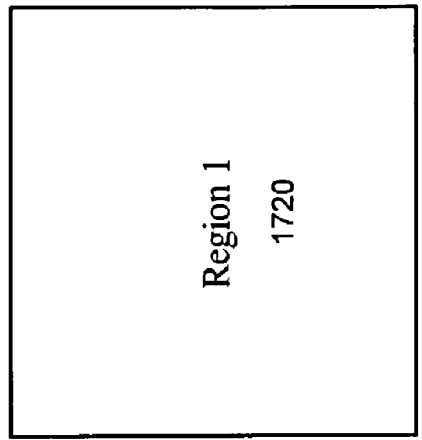
FIGURE 17A (prior art)
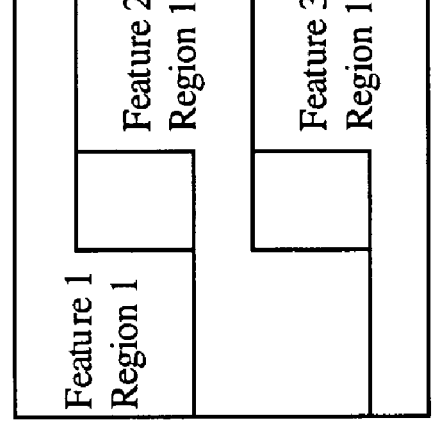
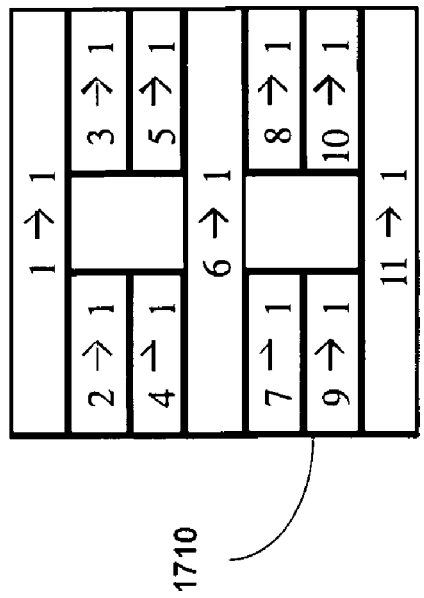
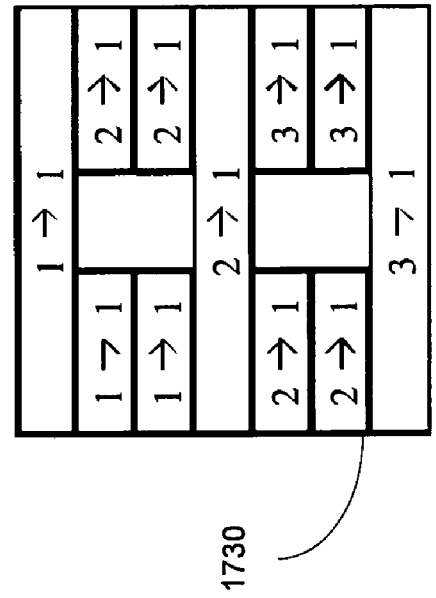
FIGURE 17B

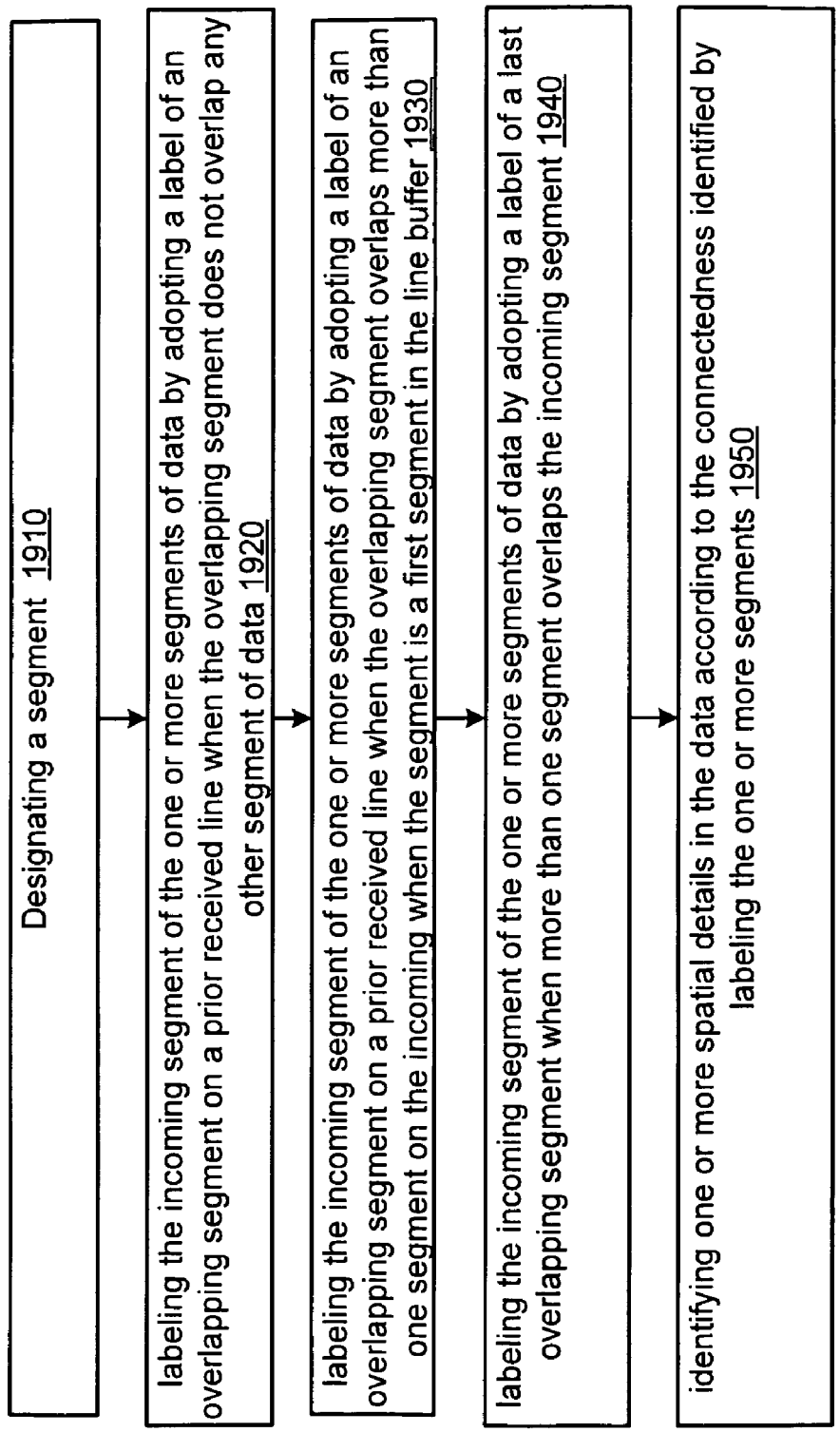

Label: <feature or region label>   Property: <color> <circle>   Boundary: <extent> or <center point, radius>,
2110                                 2120                          2130

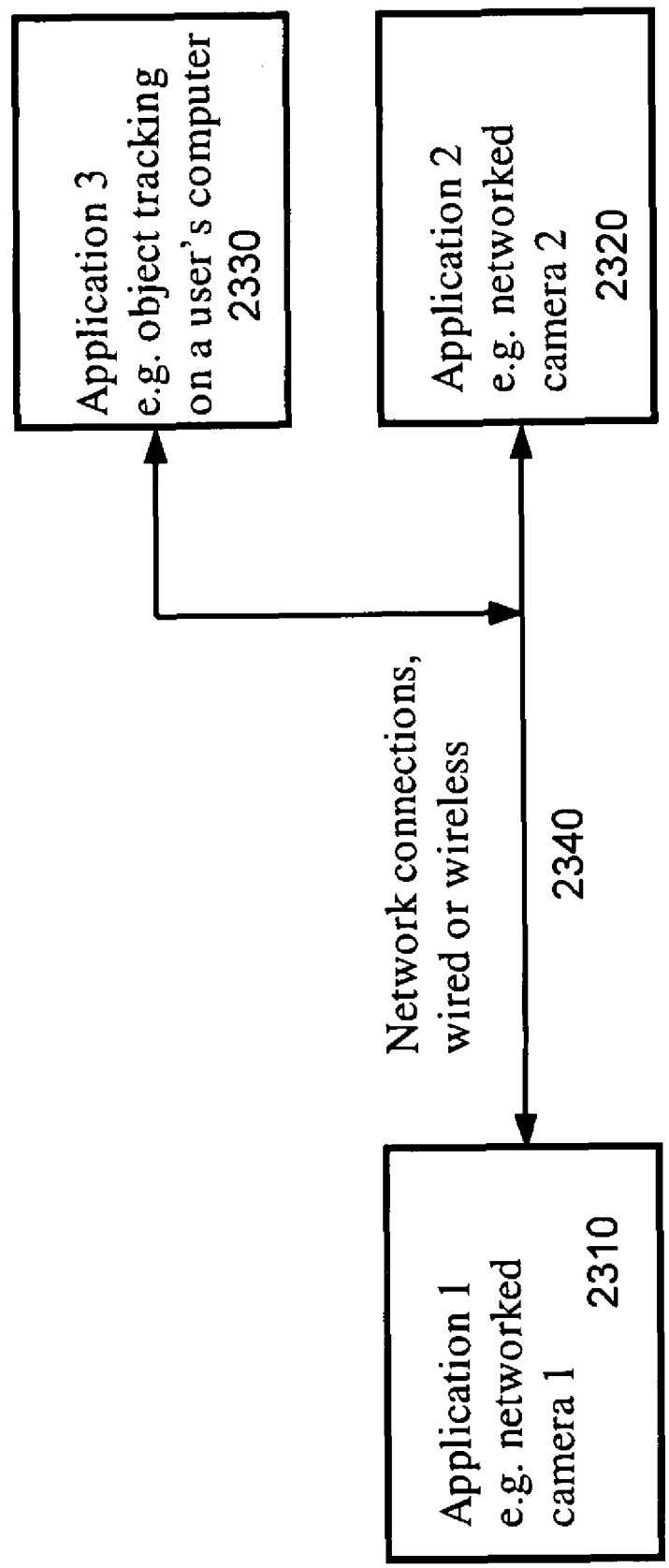

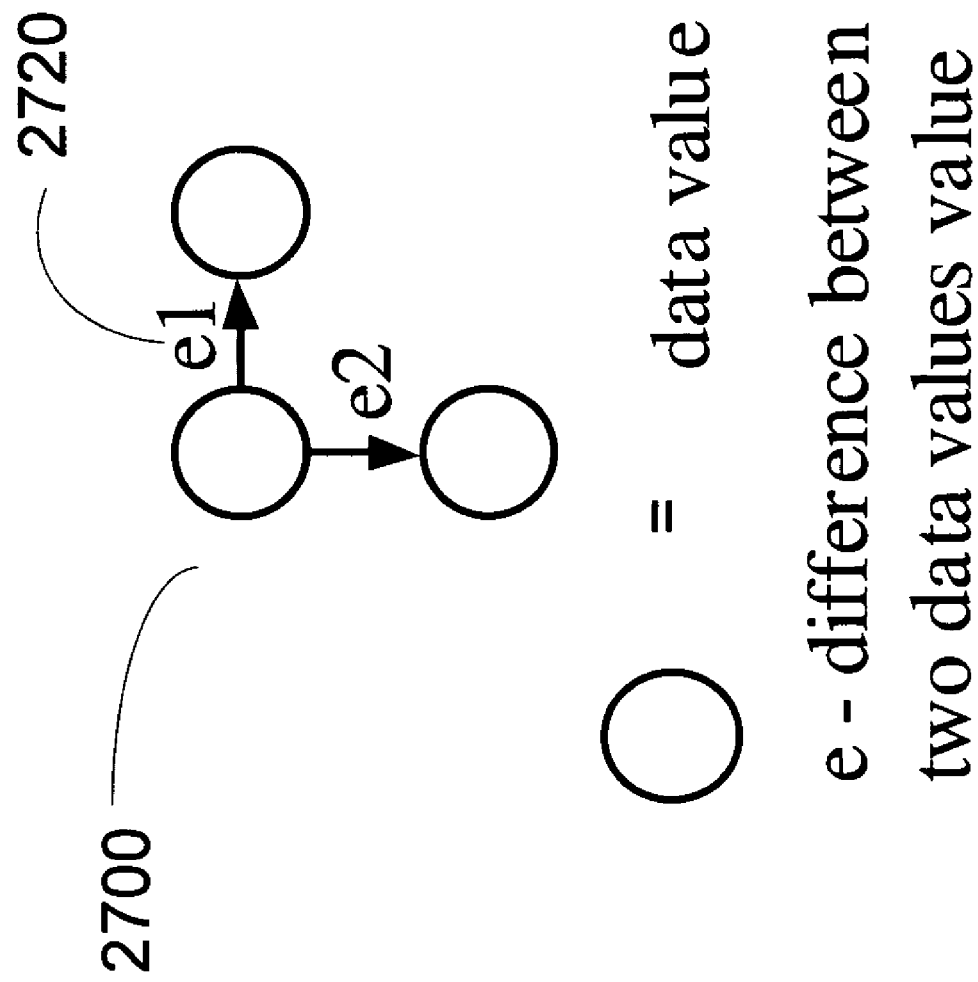

○ 3110 Previous Array
○ 3120 Current Array

Older data 3010

Newer data 3020

THREE-DIMENSIONAL SYSTEM AND METHOD FOR CONNECTION COMPONENT LABELING

TECHNICAL FIELD

The present application relates generally to the field of connected component labeling.

BACKGROUND

In general, connecting related data and maintaining an accounting of related data connections is referred to as "connected component labeling" herein referred to as "CCL". CCL is typically used for image analysis for computer vision. For example, an algorithm can be applied to an image, such as a binary image to separate object pixels from background pixels. Another use of CCL is to provide numeric labels for components identified in an image, such as a two-dimensional (2D) array. CCL is also used during the segmentation of other types of 1D, 2D, and 3D data such as financial data and digital audio. CCL and segmentation extract the needed information from data and images so that digital communications such as computer networks are not clogged with unnecessary high-bandwidth data.

Known methods to determine CCL include scanning an image to assign a provisional label and later determine a final label for each pixel. Scanning can assign such labels by locating neighbors and determining an appropriate label. Known methods include applying multi-pass labeling, two-pass labeling, depending on the complexity required for an application.

A problem with CCL methods is that memory requirements for many applications do not permit the required use of space for known CCL techniques. For example, the multi-pass labeling method requires repeated scanning and saving data in memory prior to determining a final label value for a single pixel in an image. What is needed is a CCL system and method that does not require the memory space of earlier known techniques and demands less bandwidth on networks.

SUMMARY

In one aspect, a method for three dimensional connected component labeling includes methods and systems for three dimensional connected component labeling, including determining a location value for each of one or more labels, each location value identifying a maximum "y" extent and a maximum "z" extent of an associated label region; storing each of the one or more labels that refer to areas subsumed in a determination of the maximum y extent in the maximum "z" extent as a yzMax location value; buffering in a frame buffer the one or more of labels; and providing access via a three-dimensional kernel to one or more values in a current line buffer and/or a current array and/or a previous array.

In another aspect, a computer program product includes a computer readable medium configured to perform one or more acts for performing three dimensional labeling of one or more labels the one or more acts including one or more instructions for determining a location value for each of one or more labels, each location value identifying a maximum "y" extent and a maximum "z" extent of an associated label region; and one or more instructions for storing each of the one or more labels that refer to areas subsumed in a determination of the maximum y extent and maximum z extent as a yzMax location value; one or more instructions for buffering in a frame buffer the one or more of labels; and one or more instructions for providing access via a three-dimensional kernel to one or more values in a current line buffer and/or a current array and/or a previous array.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the present application can be obtained when the following detailed description of the disclosed embodiments is considered in conjunction with the following drawings, in which:

FIG. 9B and 9C are flow diagrams illustrating a method in accordance with an embodiment of the present invention.

FIG. 11 is a flow diagram in accordance with an embodiment of the present invention.

FIG. 12 is a schematic diagram of a label buffer in accordance with an embodiment illustrating how regions are combined and propagated in accordance with an embodiment of the present invention.

FIG. 17A labeled "prior art" is a prior art diagram of a connected component labeling scheme illustrating how data can be combined to a single region.

FIG. 17B is a diagram illustrating connected component labeling that identifies features in accordance with an embodiment of the present invention.

FIG. 19 is a flow diagram illustrating a method in accordance with an embodiment of the present invention.

FIG. 23 is a schematic data flow diagram illustrating a networked application method in accordance with an embodiment of the present invention.

FIG. 27 is a diagram of a minimum connection kernel required to perform two-dimensional connected component labeling in accordance with an embodiment of the present invention.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
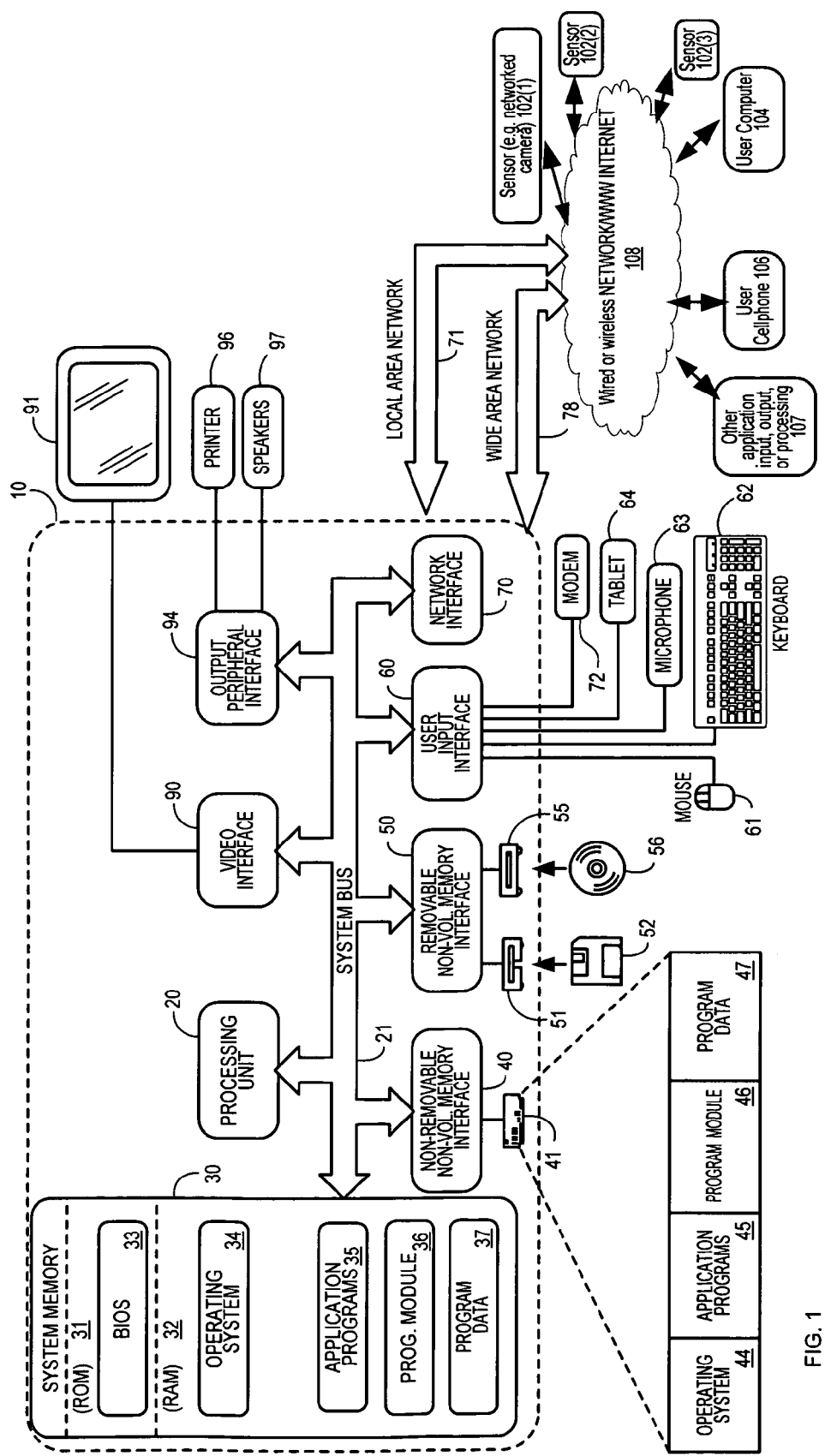
FIG. 1 is a block diagram of an exemplary computer architecture that supports the claimed subject matter.

With reference to FIG. 1, an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. RAM 32 is shown with operating system 34, application programs 35, program module 36, and program data 37. By way of example, and not limitation, FIG. 1 illustrates non-removable non-volatile memory interface 40 connected to hard disk drive 41 configured to hold operating system 44, application programs 45, and program module 46 and program data 47 in accordance with an embodiment as described herein.

The computer 10 may also include other removable/non-removable, volatile/nonvolatile computer storage media. By way of example only, FIG. 1 illustrates a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50. An interface for purposes of this disclosure can mean a location on a device for inserting a drive such as hard disk drive 41 in a secured fashion, or a in a more unsecured fashion, such as interface 50. In either case, an interface includes a location for electronically attaching additional parts to the computer 10.

The drives and their associated computer storage media, discussed above and illustrated in FIG. 1, provide storage of computer readable instructions, data structures, program modules and other data for the computer 10. In FIG. 1, for example, hard disk drive 30 is illustrated as including program module 46 and program data 47. Program modules 60 is shown including an image processing module, which can be configured as either located in modules 36 or 46, or both locations, as one with skill in the art will appreciate. More specifically, program module 46 could be in non-volatile memory in some embodiments wherein such a program module that runs automatically in an environment. In other embodiments, program modules could part of an embedded system.

A user may enter commands and information into the computer 10 through input devices such as a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a output peripheral interface 94. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like.

The computer 10 may operate in a networked environment 108 using logical connections to one or more remote computers, which could be other cell phones with a processor or other computers. As shown, network 108 is a wired or wireless network or internet, connecting sensors 102(1-3), a user computer 104, a user cell phone 106 or other mobile device, and/or an application input, output or other or further processing 107. The user computer 104 may be a personal computer, a server, a router, a network PC, PDA, cell phone computer, a peer device or other common network node, and typically includes many or all of the elements described above relative to the computer 10, although only a memory storage device 81 has been illustrated in FIG. 1. The logical connections depicted in FIG. 1 include a local area network (LAN) 71 which can be a wide area network (WAN), but may also include other networks. Such networking environments are commonplace in offices, enterprise-wide computer networks, intranets and the Internet. For example, in the subject matter of the present application, the computer system 10 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms.

Computer 10 can be connected to hardware configured in accordance with embodiments disclosed herein to accomplish connected component labeling. Computer 10 can be output device to collect data or can be included in the processing required for implementing disclosures herein. Thus, computer 10 can be agnostic to one or more disclosures and/or be incorporated as a necessary part of an embodiment as will be appreciated by one of skill in the art.

Connected Component Labeling for Segmentation

Embodiments herein relate to computer and/or processor directed actions for connected components labeling (CCL) Connected Component Labeling (CCL) for designating or labeling of groups or regions of related data. CCL commonly provides the labeling function for segmentation.

Figure 2A:
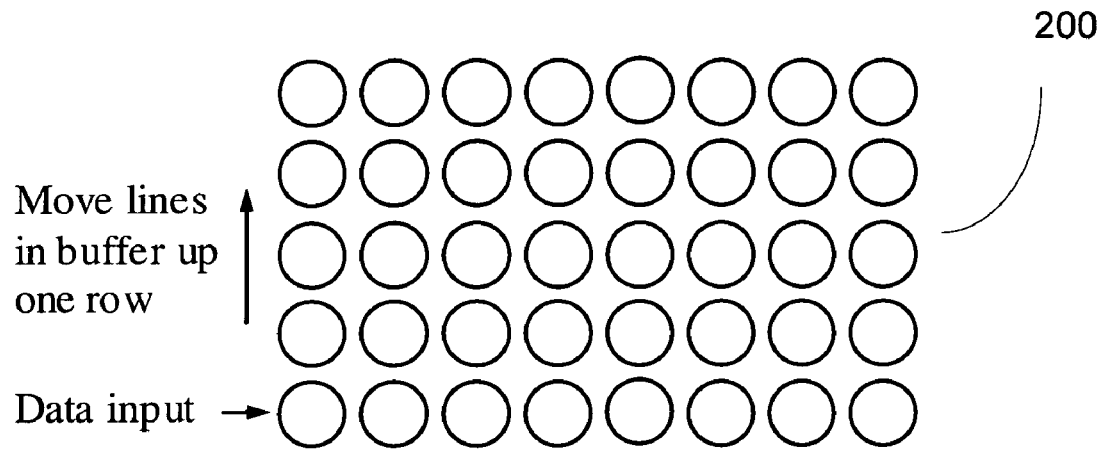
FIGS. 2A and 2B, both labeled "prior art" illustrate a label buffer and a prior art label buffer process, respectively.

In general, the data being considered can include data arranged in "raster" order, typically rows of width w stacked from top to bottom with a height of h rows. For example a specific element of image data is referenced by location, the pixel value at x width and y height is $p(x, y)$. Referring to FIG. 2A, a raster ordered buffer example is illustrated 200 which illustrates how data input is input and how lines in the buffer move up.

Segmentation applies relationship rules to arrays of data. The input to the segmentation function is individual data values. The output of segmentation is the result of iteratively applying the relationship rules to pairs of adjacent data values or groups until the whole array is processed. For example, if the rule is "segment pixels of the same color," then the segmentation function will indicate any groups or regions of matching pixels. Likewise, embodiments can be directed to segmentation based on shape or other characteristics.

Prior art techniques for connected component labeling begin with data locations that are "Labeled" or marked with unique designations. A label buffer can match the data buffer in size, so that each data location has a corresponding label location.

Figure 2B:
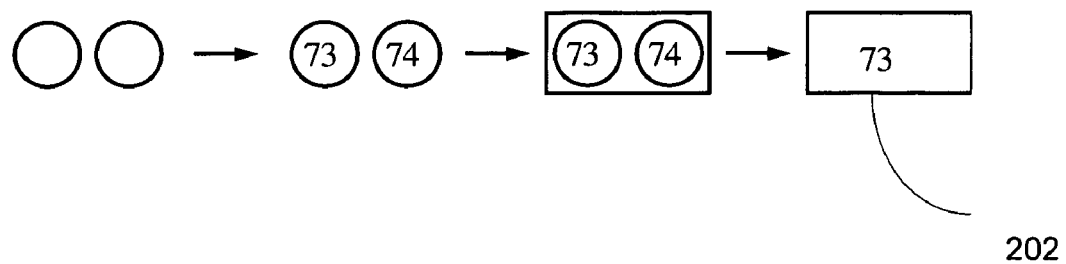

Prior art labeling provides that labels are associated in a linked list (label list) so that linked labels indicate related data. All of the different labels for different areas of a region point to one label, the "root" or "region" label. A common convention is to choose the lowest valued label. For example the related data elements labeled 73 and 74 will be entered into the label list as 74->73, and 73->73, or 74 points to 73 and 73 points to itself. The region label is therefore 73. FIG. 2B "prior art" illustrates how labels are combined to provide label 73 202 A function called "Union-Find" containing the function "Find-Root" is commonly used to perform the root search and connection of label pairs. The data values for locations 73 and 74 are combined so that the label 73 represents the collection of data at locations corresponding to labels 73 and 74.

A prior art example CCL method allows region labels to be the unique designators for data structures in memory that hold region information useful to segmentation. For example, for segmenting pixels by color, the region information structure addressed by a region label would contain the average color of that region. After segmentation, important region information has been collected, and the data can be handled as regions (#73, #68) instead of individual data elements.

In summary, CCL and segmentation are interrelated functions. CCL labels and groups data locations selected by segmentation rules. Segmentation analyzes individual data values and the collected region qualities from CCL.

The disadvantages of prior art CCL technique are numerous. For example, if the amount of data is n elements, n locations in memory for labels and region information must be allocated. Also, for prior art methods, a whole array of data must be labeled and then connected, requiring multiple passes and several operations for each data element. In prior art techniques, region growth is unpredictable, making collection of details about region shape expensive and difficult because another complicated and costly pass over the whole data set is required. As a result of prior art methods of performing CCL, the results obtained are presented ad hoc. In other words, there is no standard format for encoding and communicating region features.

Figure 2C:
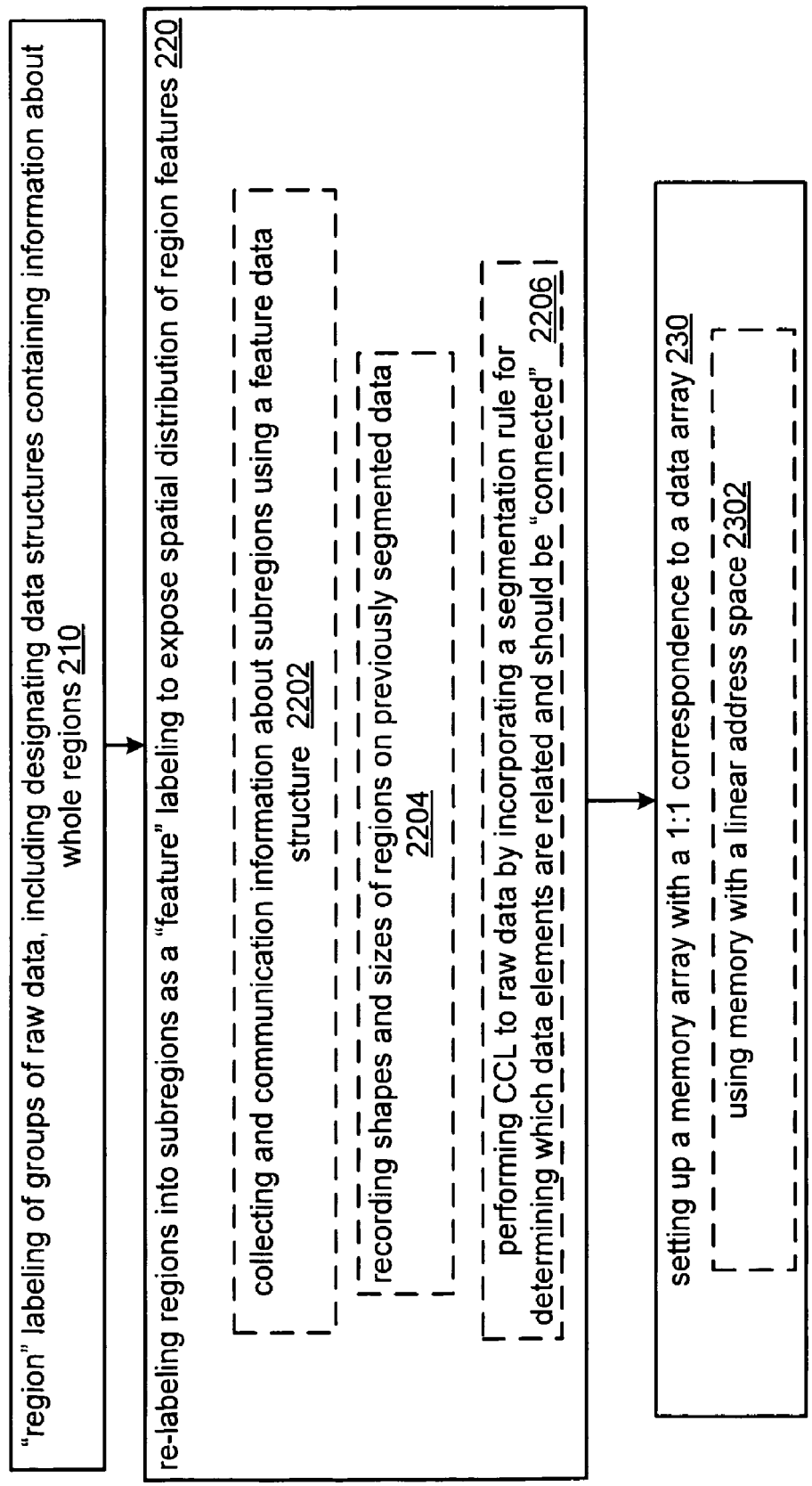
FIG. 2C is a flow diagram in accordance with an embodiment of the present invention.

Referring now to FIG. 2C, a flow diagram illustrates a method according to an embodiment. As shown, block 210 provides for "region" labeling of groups of raw data, including designating data structures containing information about whole regions. Block 220 provides for re-labeling regions into subregions as a "feature" labeling to expose spatial distribution of region features.

Block 220 includes optional block 2202 which provides for collecting and communication information about subregions using a feature data structure. More particularly, feature labels can designate the feature data structures, such as a feature data structure for containing information about subregions. The feature data structure can provide for collecting and communicating feature information. As a result, features can be acquired with controllable precision that uses an architecture that minimizes the memory required for pre-CCL actions, such as segmentation. By designating feature labels, memory required for acquiring region features is optimized.

In one embodiment, as illustrated in optional block 2204, the method provides for recording shapes and sizes of regions on previously segmented data. In another embodiment, the method provides in optional block 2206 for performing CCL to raw data by incorporating a segmentation rule for determining which data elements are related and should be "connected." Thus, CCL can operate on labels applied during segmentation or CCL can be configured to re-label data without regard for previous processing.

In general the data being considered is arranged in "raster" order, typically rows (lines) of width w stacked from top to bottom with a height of h rows. For example a specific element of image data is referenced by location, the pixel value at x width and y height is p(x, y).

Figure 3:
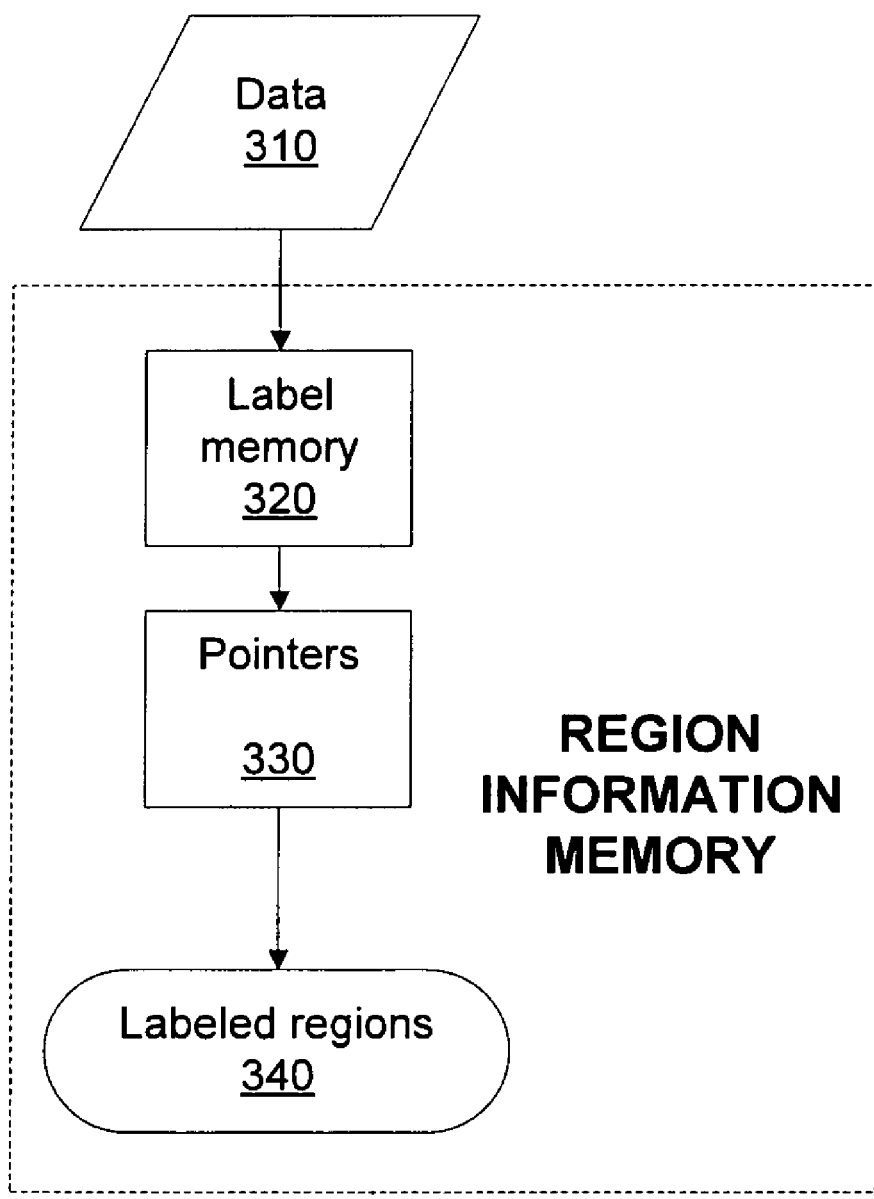
FIG. 3 is a schematic diagram illustrating an embodiment of region information memory in accordance with an embodiment of the present invention.

Block 230 provides for setting up a memory array with a 1:1 correspondence to a data array. More particularly, the data in the data array is labeled by setting up a memory array that is addressable in a 1:1 correspondence to the data array. For example, if the data is indexed by p(x, y), then the labels can be indexed by Lp(x, y). Depicted within block 230 is optional block 2302 which provides for using memory with a linear address space. Thus, labels can be indexed by p(m), where m is equivalent to (x, y), for example m=(y*w)+x. Additional or optional appropriate spatial conversion and/or memory address offset calculations may be required. For example, the memory address and contents will be Label[73]=73 and Label[74]=73 for the example. Regions 73 and 74 are merged. Referring to FIG. 3, an exemplary CCL operation on label memory is illustrated. As shown, raw data 310 is identified as regions 73 and 74 as labels in label memory 320. Next, labels are connected by pointers 330 and finally, a region label 340 is produced as label 73.

Additionally, some region qualities might be collected such as region size, shape, or color. Region qualities can be combined such that no more memory is required to store the result of combining regions. For example, "average region color" will require the same amount of storage space regardless of how many regions were combined during segmentation. The region qualities are stored in memory addressed by region labels with address conversions and/or offsets as needed.

Figure 4:
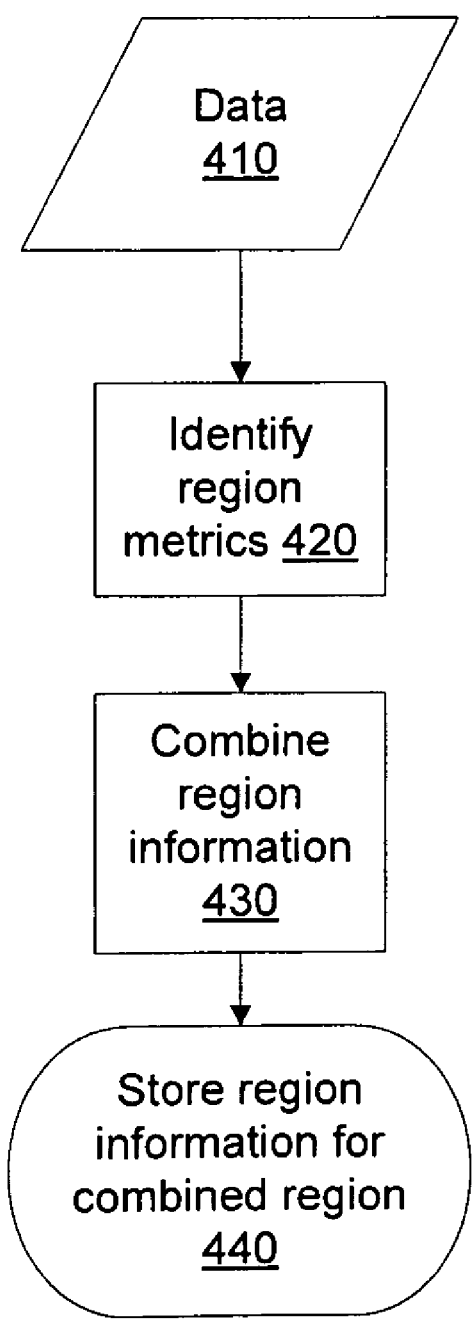
FIG. 4 is a flow diagram in accordance with an embodiment of the present invention.

The CCL operations on region information memory are illustrated in FIG. 4. Specifically, as shown, there can be four regions. Raw data 410 is identified as region metrics in region information memory 420, the region information in 74 is then combined with 73 in block 430, and region information for region 73 is then stored 440. Each of the memory areas have the same indexing scheme taken from the original data label such that the original data label provides the raw data index, data label index, region label index and region information index. The same indexing scheme can provide different kinds labels for data, region, border information and other types of information about the raw data 410.

Figure 5:
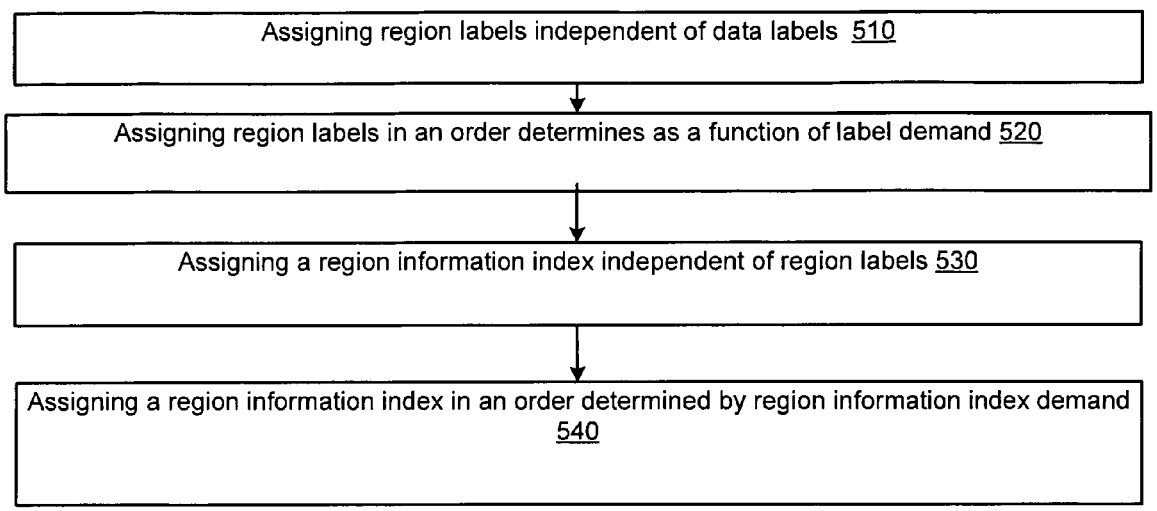
FIG. 5 is a flow diagram in accordance with an embodiment of the present invention.

Referring now to FIG. 5, an embodiment is directed to a method for storing region data. Block 510 provides for assigning region labels independent of data labels. Rather, block 520 provides for assigning region labels in an order determined as a function of label demand. Block 530 provides that a region information index is assigned independent of region labels. Rather, block 540 provides for assigning a region information index in an order determined by region information index demand. As a result of the independence from data labels and region labels, it has been discovered that line buffer segmentation processes are supported and Union-Find and Find-Root algorithms are supported while minimizing memory usage. Moreover, assigning an order based on index demand can be applied to different types of data. For example data labeling beyond data and region labeling can include border data, color data, subregion data, and stochastic data.

Line Buffer

A line buffer, for purposes of the present disclosure, can include one or more lines of memory, each line of memory containing a line of data, which can be image data. The data may be stored in different formats, such as a run length encoded (RLE) format. The data locations making up the lines of memory and the lines of memory making up the line buffer may or may not be contiguous memory locations.

Figure 6:
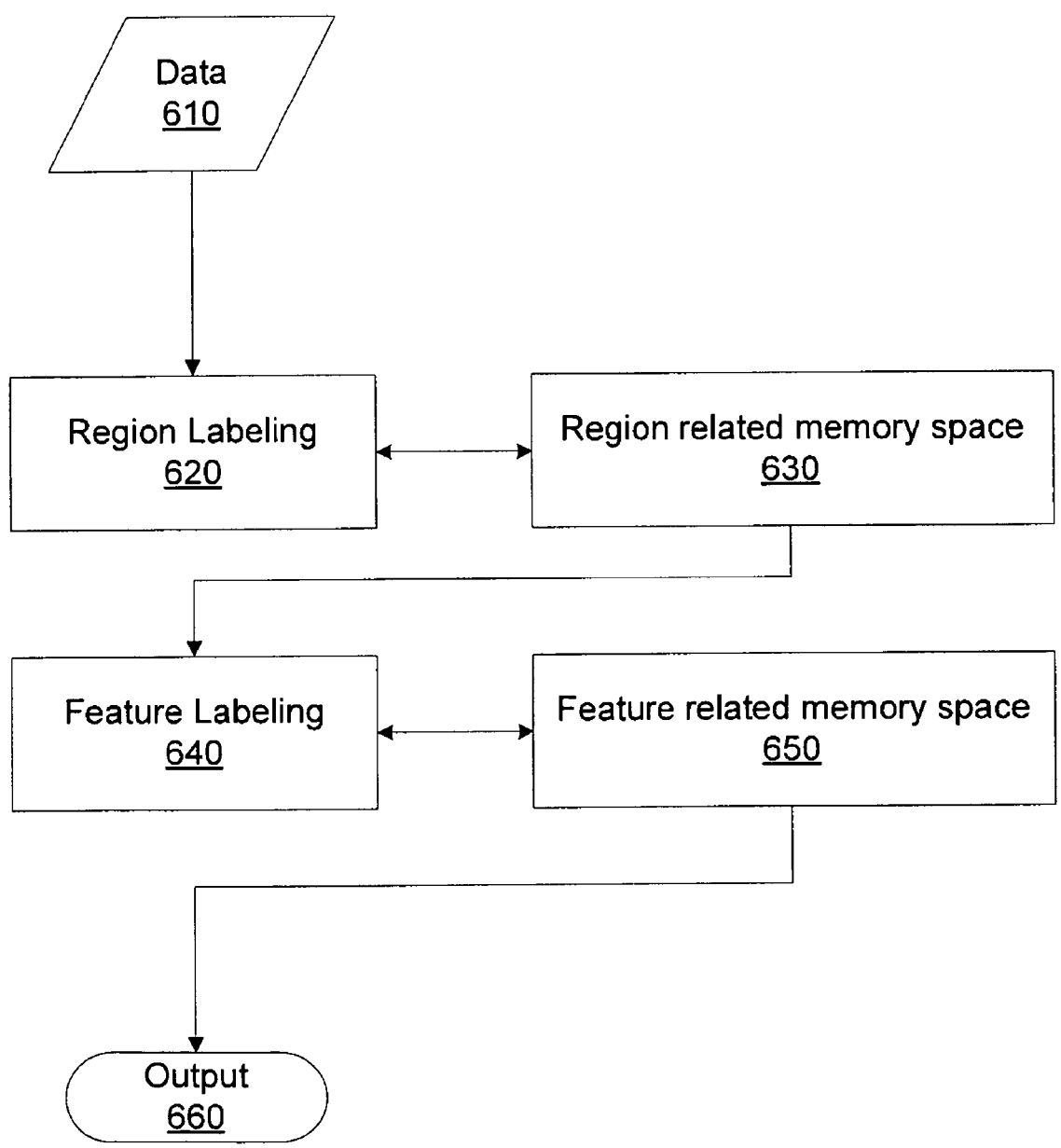
FIG. 6 is a flow diagram in accordance with an embodiment of the present invention.

Referring now to FIG. 6, a method for operating a CCL using a line buffer is illustrated. More particularly, a data stream from a video camera or computer network can be processed in a data buffer (memory) by writing the newest line of data at the bottom of the buffer while moving all of the existing data in the buffer up one row. As a result, segmentation methods are supported that can operate on data in line buffers. For example, a segmentation process can be executed such that the upper lines of the buffer are completely segmented before the lower lines of the buffer.

Block 610 provides for moving all of the data in a line buffer up one row when a top row of data is fully segmented. Block 620 provides for entering the next data line in the bottom row of the buffer. Block 630 provides for segmenting the data in the buffer. Block 640 provides for moving all the data in the buffer up one row when the top row of data is fully segmented. Block 650 provides for entering the next data line in the bottom row of the buffer. Block 660 provides for repeating the process until complete.

Referring back to FIG. 2A, the line buffer is illustrated can that is appropriate for embodiments. More particularly, FIG. 2A includes several lines and illustrates apparent movement of the line buffer over the input data, such as an image. Advantageously, instead of buffering the full image, only a few lines at a time are stored in memory. Further, the actual xy coordinates of data can be derived from the xy coordinates in the buffer along with the location of the buffer over the complete data array. Next, region labels are assigned to the data buffer locations.

Figure 7:
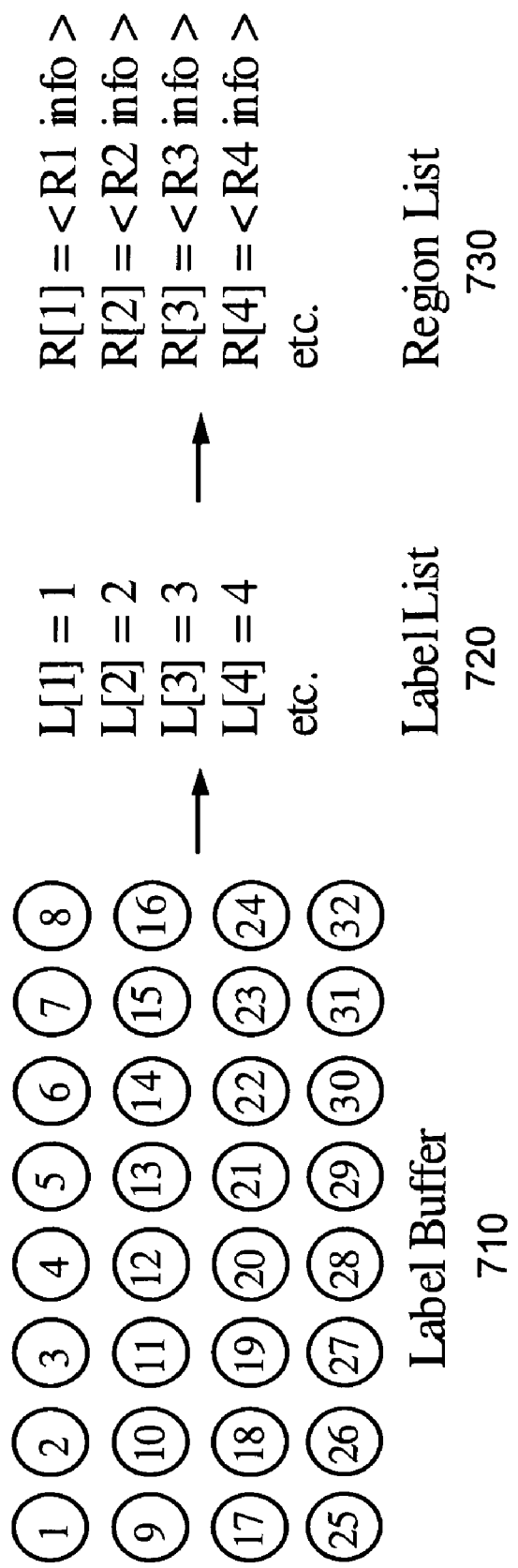
FIG. 7 is a schematic diagram illustrating label buffer, label list and region list storage in accordance with an embodiment of the present invention.

Referring now to FIG. 7, labeled "prior art", a label buffer 710 is illustrated on the left, followed by a label list 720 and a region list 730 is illustrated on the right. The labels in a region buffer point to the region list 730 which also points to the list of region structures located in memory.

Arbitrary Labeling

Figure 8:
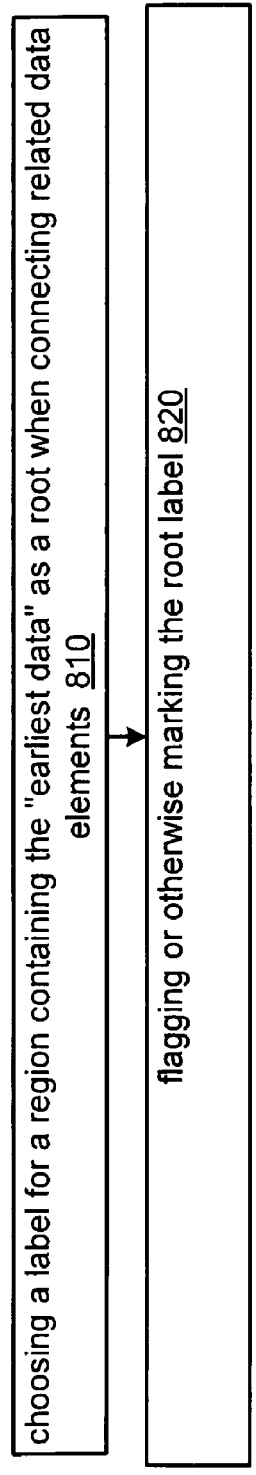
FIG. 8 is a flow diagram in accordance with an embodiment of the present invention.

According to an embodiment, label index allocation can be arbitrarily assigned such that labels have a random quality. For example, a label allocation can be assigned 1, 8, 2, 25, etc., such that labels are neither in increasing order or in an ordered sequence. Further, labeling can be performed such that the relationship between data labels, region labels, and region information indices is made more independent while maintaining label coherency, thereby enabling arbitrary and independent labeling. Referring to FIG. 8, a flow diagram illustrates a method for enabling arbitrary and independent labeling for CCL. Block 810 provides for choosing a label for a region containing the "earliest data" as a root when connecting related data elements. For example, for the raster-ordered example, the top row is y=0 and the first column is x=0. A segmentation process might expect labels ordered as shown on the top two rows. The "earliest data" will have the lowest result for $((y*w)+x)$. The data labeled 91 and 75 are linked. Label 91 is selected as root according to the test. According to an embodiment, other conventions for selecting the root label can be adopted.

Block 820 provides for flagging or otherwise marking the root label. Specifically, the root label no longer points to itself, so the root label is flagged or marked. For example, an unused memory bit may be set.

Figure 9A:
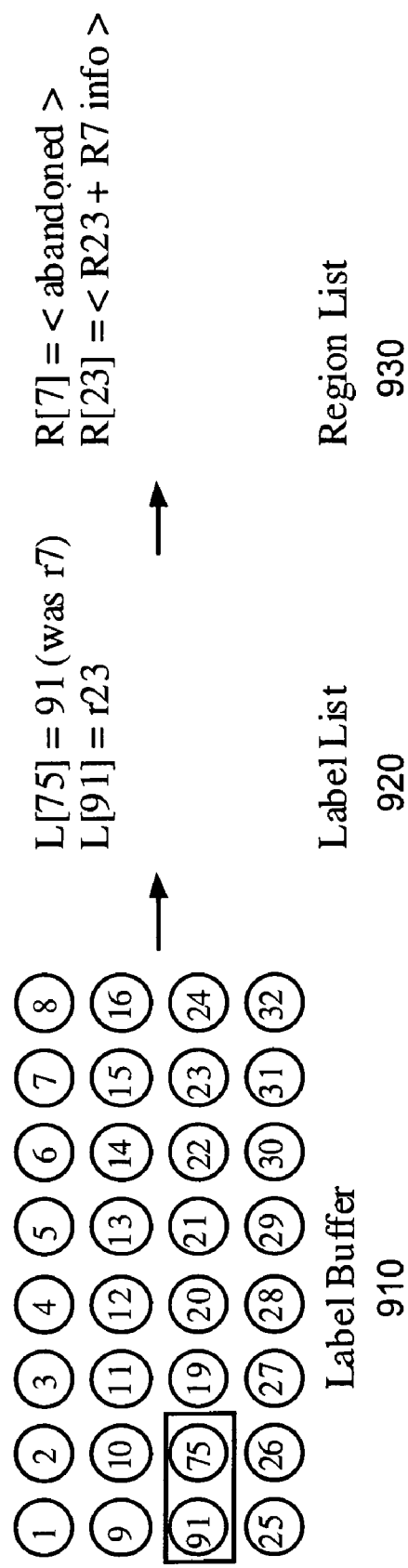
FIG. 9A is a schematic diagram illustrating an alternate embodiment of the present invention.

Referring to FIG. 9A in combination with FIG. 7, label buffer 910 includes an arbitrary label "91" that is arbitrary but indexed by label list 920 to location r23. Region list 930 identifies region R[23] as including r23 and r7 information. According to an embodiment, the flagged root label contains the region list index. In the example, the "r" in the label list 920 at L[91] indicates a region list index. L[75] has had its original r7 index overwritten by a pointer to L[91].

Label Reuse and Memory Allocation Efficiency

Figure 9B:
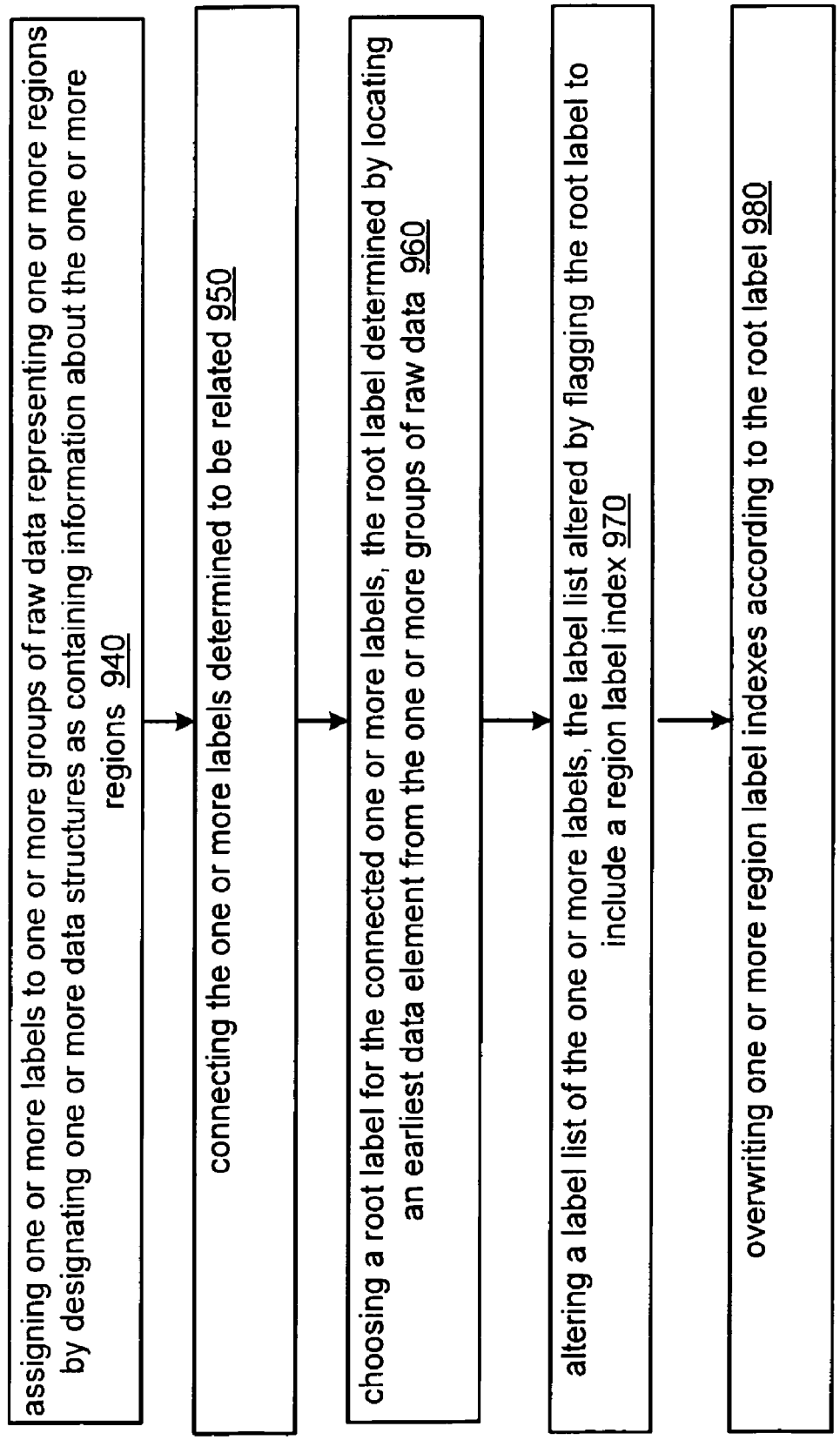

Referring now to FIG. 9B, a method for label reuse is shown in a flow diagram. Block 940 provides for assigning one or more labels to one or more groups of raw data representing one or more regions by designating one or more data structures as containing information about the one or more regions. For example, label buffer 910 in FIG. 9A can interact with instructions received from a module, ASIC or the like. Block 950 provides for connecting the one or more labels determined to be related. Block 960 provides for choosing a root label for the connected one or more labels, the root label determined by locating an earliest data element from the one or more groups of raw data. In one embodiment choosing a root label for the connected one or more labels includes determining the earliest data element according to a lowest result for $(x+(w*y))$ wherein y represents a row value, x represents a column value, and w represents a width (total number of columns) value. The earliest data element can be according to a first-in-first-out (FIFO) algorithm for raster-organized data arrays. The choosing can also be accomplished by flagging the root label by setting an unused memory bit when a prior root label no longer points to itself.

Block 970 provides for altering a label list of the one or more labels, the label list altered by flagging the root label to include a region label index. For example, the altering can include flagging the root label by setting an unused memory bit when a prior root label no longer points to itself.

Block 980 provides for overwriting one or more region label indexes according to the root label. Thus, region label indexes are reused. For example, a pointer can be provided to the root label.

Referring now to FIG. 9C a flow diagram illustrates a method for reusing one or more labels in a connected component labeling system. Block 990 provides for determining a location value for each of the one or more labels, each location value identifying a maximum "y" extent ("yMax") of an associated label region. For example, determining a location value can include assigning as the yMax value a y coordinate for each label of the one or more labels located in a memory, the y coordinate assignment based on a row level in the memory. In one embodiment, determining the y coordinate can be a function of the row level in the memory wherein the memory is a data buffer configured to receive label and region information in a receiving row. In an embodiment, determining the row level can be according to raster order of rows wherein the rows of are formed by moving data up from a bottom row to a top row. For example, label and region information could include receiving in the memory and determining the y coordinate as a function of the row level in the memory wherein the memory is a data buffer configured to receive label and region information in a bottom row.

Block 992 provides for determining which of the one or more labels refer to areas subsumed in a determination of the yMax location value. When determining which of the lables refer to areas subsumed, an embodiment directs storing a location of each root in an associated region information location to enable label comparison during subsuming of label data.

Block 994 provides for reusing the one or more labels and/or region information memory location values subsumed in the determination of the yMax location value.

In one embodiment, the method for reusing includes determining that a row of the memory is fully processed and/or about to be overwritten. Next, for each label in the fully processed and/or about to be overwritten row, the method directs comparing each yMax value to a y coordinate for the row. For each yMax value that matches the y coordinate, the method calls for designating an associated label as an available label. For each yMax value that does not match the y coordinate, the method then directs determining that the yMax value is associated with a series of labels. Next, the method compares each yMax value in the series of labels to the y coordinate. For each yMax value in the series of labels that matches the y coordinate, the method designates an associated label as an available label.

In another embodiment, the reusing includes determining whether the one or more labels and/or region information memory location values are part of a tree structure and locating a root of the tree structure to enable reusing an associated label and/or region information memory location value associated with the root.

In another embodiment, the reusing includes enabling each yMax location value to propagate from root value to root value of each region such that each region root contains a yMax location value that is an actual maximum y coordinate.

Block 996 provides for comparing two or more yMax values to determine a maximum yMax value. Block 998 provides for assigning the determined yMax value as a root result.

Figure 10A:
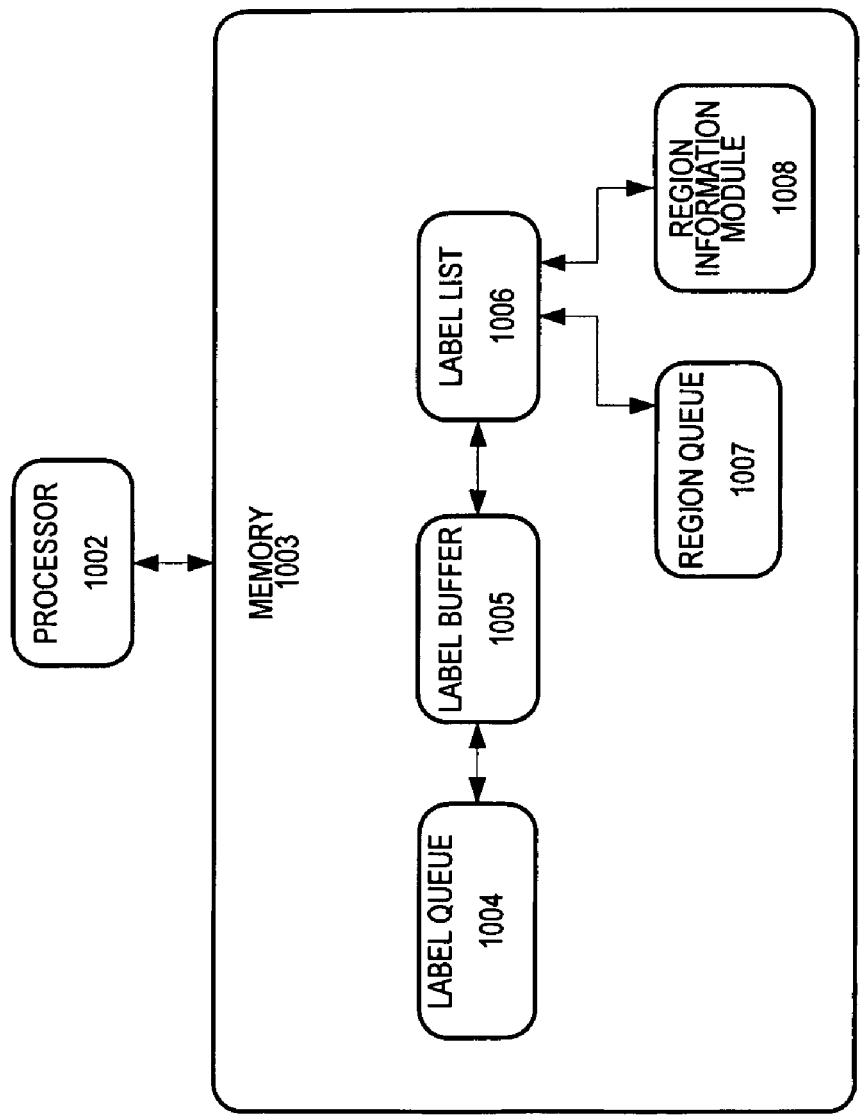
FIG. 10A is a system diagram illustrating a system in accordance with an embodiment of the present invention.

Referring now to FIG. 10A, a connected components labeling system appropriate for enabling label reuse is illustrated. FIG. 10A shows a processor 1002, and a memory 1003 coupled to the processor 1002. Memory 1003 includes a circular buffer 1004 configured to contain a plurality of locations for holding one or more region labels for the connected components labeling system and a label buffer 1005 coupled to the circular buffer. Label buffer 1005 is configured to be initialized with a sequential count at the beginning of an operation for each array of input data in a raster order. Further, label buffer 1005 holds current labels in use during an operation, and is independent from the height of a connected region. FIG. 10A also illustrates a label list 1006 coupled to the label buffer 1005 and the circular buffer 1004 the label list 1006 receives closed labels no longer required by label buffer 1005. Label list 1006 can be initialized with a maximum number of label position to prevent a last label from overtaking a lead label and return label availability to circular buffer 1004 in ascending order.

FIG. 10A further includes region queue 1007 coupled to label list 1006. Region queue 1007 can be configured to send and receive a plurality of region information locations equal to a number of possible roots. FIG. 10A further can include region information module 1008 coupled to label list 1006. In an embodiment, region information module 1008 outputs region information wherein the maximum number of region information locations is equal to the number of possible roots, the number of region information locations being a fraction of the maximum number of region information locations.

Figure 10B:
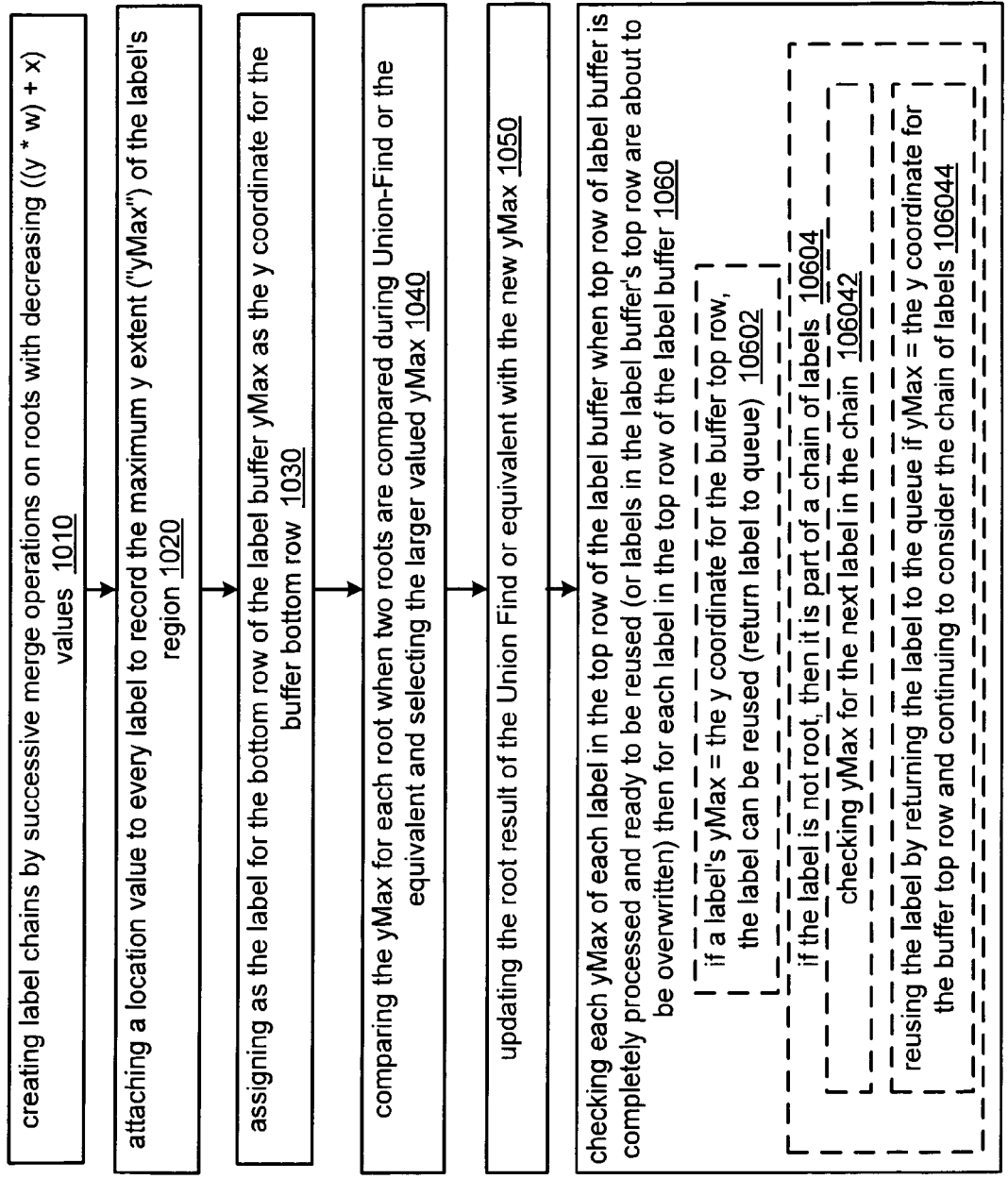
FIG. 10B is a flow diagram illustrating a method in accordance with an embodiment of the present invention.

Referring now to FIG. 10B, another embodiment is directed to enabling reuse of label and region information in memory locations that are no longer needed. More specifically, one problem is that labels that are not roots and no longer in use inside the buffer area may be required by a Find-Root function. Block 1010 provides for creating label chains by successive merge operations on roots with decreasing ((y*w)+x) values. For example, a chain of labels such as 5-65-74-342-2-57(root) might be created. If any of these labels is destroyed, a Find-Root on 5 will not return 57. Even if 65, 74, 342, 2 and 57 have moved out of the buffer and are no longer being processed by segmentation, an attempt to perform segmentation with label 5 will fail. The problem is that there is no way to detect when a label is no longer needed without scanning the whole label list.

Block 1020 provides for attaching a location value to every label to record the maximum y extent ("yMax") of the label's region. The y extents are the top and bottom locations of a region's spatial location. In one embodiment, the method provides that only the root result of each Union-Find operation has the yMax value updated. Even if some method other than Union-Find is used there is still an implicit comparison of two roots from which one root will remain. Only two operations are required, compare and write, both of which can be executed in parallel with other Union-Find operations so that no time or delay is added to the CCL process.

Block 1030 provides for assigning as the label for the bottom row of the label buffer yMax as the y coordinate for the buffer bottom row.

Block 1040 provides for comparing the yMax for each root when two roots are compared during Union-Find or the equivalent and selecting the larger valued yMax. Block 1050 provides for updating the root result of the Union Find or equivalent with the new yMax. Block 1060 provides for checking each yMax of each label in the top row of the label buffer when top row of label buffer is completely processed and ready to be reused (or labels in the label buffer's top row are about to be overwritten) then for each label in the top row of the label buffer. More specifically, block 10602, depicted within block 1060 provides that if a label's yMax=the y coordinate for the buffer top row, the label can be reused (return label to queue), which optimizes memory usage.

Block 10604, also depicted within block 1060 provides that if the label is not root, then it is part of a chain of labels. Block 106042 provides for checking yMax for the next label in the chain. Block 106044 provides for reusing the label by returning the label to the queue if yMax=the y coordinate for the buffer top row and continuing to consider the chain of labels. Chains in accordance with an embodiment can be created by successive merge operations. Successive merge operations propagate higher yMax from root to root. As the chain is traversed to root, yMax can not decrease. Label chains and label reuse in connected component labeling enables processing for any sized object. More specifically, the yMax procedure explained above is agnostic to at least one dimension of data, which enables segmentation and CCL in a line buffer. Moreover, by successive application of the yMax procedure, the number of dimensions of data can be extended as needed by system requirements.

As a result of the method described in FIG. 10B, the CCL is based on merging regions by pointing one region root at another region root resulting in one root, thereby making every region have one root. Further, only a region's root yMax is updated. Further, every label is either root or has been merged as root at least once during the process. Further, only roots are merged. After operating the method, the yMax propagates from root to root. Therefore, for every region, the region root contains the yMax that is the actual maximum y coordinate for that region. The non-root labels in the region are part of a chain of pointers to root. No labels will escape reuse, even if several chains combine before the root is reached (tree structure). Therefore, the method reuses labels completely, and no labels are missed.

In one embodiment, when a label and label memory is initially allocated for use, for example, when a label is applied at the bottom of the buffer, or when a region info structure is filled with a new label's data, the memory space is termed "opened." When the memory space is no longer needed and can be reused it is "closed."

As a result of reusing labels and the methods as described above, the region information memory locations that were potentially unused after region merge operations are now known to be available for reuse, which optimizes memory. For every merge operation between two regions, one region label will no longer be root. Every root label has a corresponding region information structure in memory.

From the time a label is no longer root to the time the label is closed by the yMax technique, the region information structure for that label is unused. In an embodiment, yMax is stored in the label list instead of the region list. Because yMax is stored in the label list, the non-root region info structure has no useful information. As a result, the region info structure can be closed as soon as the region label pointing to it is no longer root. Therefore, for every region merge operation, one region info structure can be closed. The region info locations pointed to by the root labels can be closed when the corresponding root label is closed according to yMax.

Note that if linking conventions need to be maintained, then the actual (x, y) location of each root can be included in the region info locations. The actual (x, y) is useful for comparing labels to choose root during merge operations.

As a result of the method described both region labels and region information structures now have exact conditions when they can be closed. Memory usage is made maximally efficient because memory locations are closed as soon as the memory location is no longer needed. Region labels can be closed when yMax is satisfied. When a root label is closed by the yMax method, the associated region information structure can be closed. When a root label becomes a non-root label during region merging, the non-root region information memory space can be closed. In one embodiment, the method using yMax is also key to making the line buffer technique work for CCL. Thus, any size region can be segmented in any size line buffer, which is a tremendous savings in memory and a breakthrough for CCL in embedded applications.

Label Queue

A problem with label queuing includes the closing of region labels and region information locations in an unpredictable order. CCL works with arbitrary labels if the methods disclosed herein are applied. The labeling methods herein described enable reallocation and opening of labels and region information locations in the order in which they were closed.

The number of labels required for the CCL methods disclosed herein efficiently result in less than the width multiplied by height amount of labels required with known techniques. The number of labels required as herein disclosed is a function of both buffer size and a chosen segmentation method. Specifically, the number of labels increases with the size of the buffer; the number of labels decreases with the increase in aggressiveness and/or effectiveness of a chosen segmentation method. Label requirements also vary with differing image or data conditions. For example, an image with many objects can require many labels. Therefore, according to an embodiment, a method allows for optimization of memory usage according to one or more of image conditions, application requirements, and/or segmentation techniques. More specifically, in an embodiment, image conditions can be such that memory must be allocated for fine details and an embodiment addresses the label requirement for such known conditions. For example, an image of a detailed tree could require memory allocation for leaf regions. In contrast, a memory allocation that prioritizes application usage could be configured to ignore leaf detail requirements in memory. Likewise, a memory allocation that prioritizes segmentation techniques could ignore leaf details as well.

Referring now to FIG. 11, a flow diagram illustrates a method in accordance with an embodiment. Describing the required number of labels as maxLabels, the required number of region information locations is smaller than maxLabels. Allow the data name maxInfo to represent the number of region information locations. Block 1110 provides for creating a circular buffer, or "queue," with maxLabels locations holding all of the region labels. Block 1120 provides for creating an array "LabelQueue[maxLabels]" as a circular list with a head and tail index. Block 1130 provides for opening a next label as openlabel=label[head]. Block 1140 provides for returning a closed label to the list at label[tail]=closedlabel. Block 1150 provides for initializing the label list with label [i]=i, i=0 . . . maxLabels.

Initially, head=0 and tail=0. Thus, labels are first opened in ascending order, 0-maxLabels. Labels return to the circular list for reuse in the order closed. The label list will become disordered but will remain correct (tail will not overtake head), because there can only be a maxLabels number of labels open at a time. The RegionQueue[ ] also follows the same method described in FIG. 11.

In an alternate embodiment, block 1160 provides for reducing the label queue size by initializing the label buffer with a sequential count at the beginning of a segmentation or CCL for each full array of input data. For example, when a new image is to be segmented or labeled via CCL, the method directs initializing the label buffer from a counter with a sequential count applied to each buffer location in raster order. As a result, the label queue size required is large enough to contain the number of labels that might be required to label chains and roots for the portion of regions that extend outside the top of the label buffer.

The absolute maximum number of region info locations is equal to the number of possible roots, i.e., the number of locations in the line buffer plus one row. The actual number of region information locations results in some fraction of the maximum unless a segmentation error occurs.

In accordance with embodiments disclosed herein, the maximum number of labels becomes greater than the maximum number of roots due to label chains that cross the top row of the buffer. More specifically, the maximum number of labels results in the number of buffer locations plus an estimate for the number of links outside the buffer on chains that cross the top row of the buffer, plus the number of roots above the top row of the buffer for regions that cross the top row of the buffer.

Referring now to FIG. 12, segmentation performed on a line buffer 1200 is illustrated showing the flow of data through the buffer. The raw data input 1210 is grouped with similar neighbors until larger regions 1220 are created. As the data moves up from the start of segmentation 1230 through the buffer until segmentation ends 1240, the regions in buffer 1200 become larger.

At the top of the line buffer 1200, segmentation is practically finished and the 1:1 relationship between labels and raw data locations is at an end. The result of segmentation needs to be acquired from the top line at data output 1250. Segmentation precedes feature labeling, or the data is in a form that is effectively segmented. For example, text made of black characters on a white background. For ease of discussion, the input to feature labeling will be shown as line segments that are considered to be already labeled; the regions are known. The use of line segments does not preclude the use of Feature Labeling on unsegmented, unlabeled, or raw data.

Line Segments from Segmentation Labels

Figure 13:
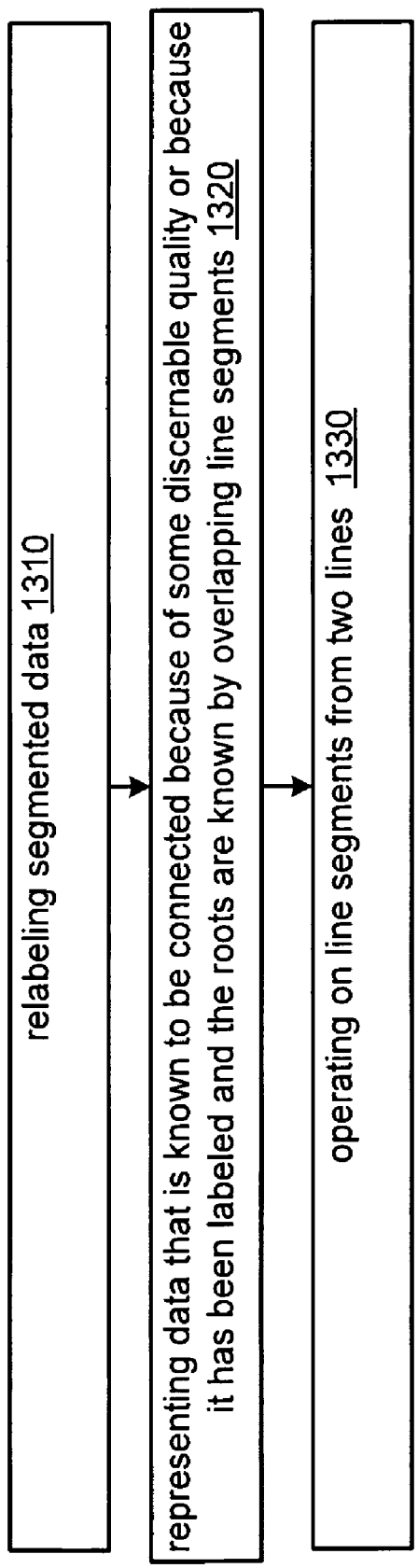
FIG. 13 is a flow diagram illustrating a method in accordance with an embodiment of the present invention.
Figure 14:
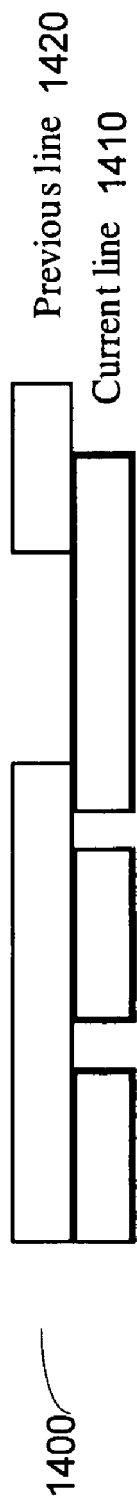
FIG. 14 is a schematic diagram of a label buffer current line and previous line in accordance with an embodiment illustrating in accordance with an embodiment of the present invention.

Referring now to FIG. 13, a diagram illustrates a method for a simple model made of line segments. Labeled line segments represent the input data. Line segments with labels pointing to the same root are considered to be connected. Block 1310 provides for relabeling segmented data. Block 1320 provides for representing data that is known to be connected because of some discernable quality or because it has been labeled and the roots are known by overlapping line segments. Block 1330 provides for operating on line segments from two lines. Referring to FIG. 14, a Features Label diagram 1400 illustrates the simple model with the "Current Line" 1410 representing the newest data or the segmented data from the top of the segmentation label buffer. The "Previous Line" 1420 represents the previous line of input data or the previous line taken from the top of the segmentation label buffer. Empty spaces between segments represent data that has no connections relevant to the current discussion.

Line Segments from Data

Figure 15:
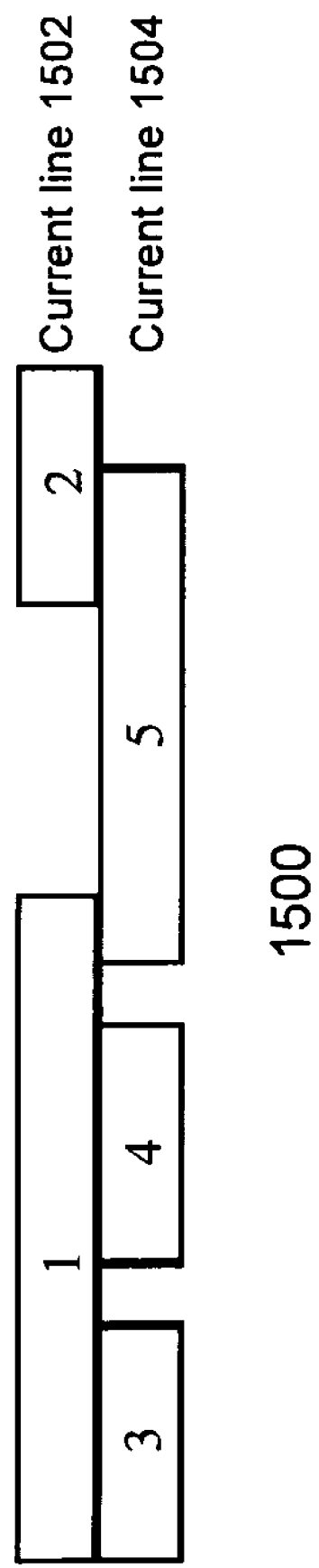
FIG. 15 is a flow diagram illustrating a method in accordance with an embodiment of the present invention.

Referring to FIG. 15, a raster-organized data 1500 is arranged in horizontal lines read left to right. The lines are stacked top to bottom to make a 2-D array such as image data arranged to display an image. For exemplary purposes, this disclosure represents a segment, such as a line segment, as an unbroken sequence of one or more of the same data value organized horizontally on a raster line. Other ways of organizing or representing data can be considered a segment. Data can be Run-Length Encoded (RLE). Other data relationships may be chosen by a user or other relationship choosing automatic or responsive program as required by the application. For example, segments can be created by dissimilar data or data with arbitrary relationships. Non-linear relationships can be applied to the data, such as connecting data based on spatial relationships such as shape.

A common Union-Find data structure is known as the linked-list. Labels are the indexes of the linked list locations and the data of each location is a pointer to another label. The labels are linked by the pointers to associate the labels representing a group of related segments. One of the labels in a linked group is chosen as the region number or "root". Typically, the root is the lowest label number. For example, labels 1, 2, 3, 4, 5, 6, and 7 can point to label 1 as the region number (root). The pointing creates a tree structure wherein the elements (labels 1, 2, 3, 4, 5, 6, 7) point to the root (label 1).

The input data elements are numbered (labeled) and each label is an index of the linked list. For example, data element #3 is listed as Label[3]=3. As the connected data labels are linked, all of the labels will point to the root or region label.

Modified Propagate Last Labeling

According to an embodiment, a method for modified propagated last labeling is provided that enables collection of region features (feature encoding) using only one line of data memory and the equivalent of one line of feature structures. According to an embodiment, the input to Propagate Last Labeling includes using known-connected line segments which are to be relabeled with regard to connectedness but without regard to previous labeling except to take advantage of labels indicating connectedness. In one embodiment, a labeling method numbers and/or labels each of the segments in raster order. In the embodiment, the root label designates the region segments.

Propagated labeling saves memory space by immediately reusing labels. Labels are applied as the data arrives, left to right, top to bottom. Overlapping segments take the label from the segment above.

"Modified Propagate Last" refers to an embodiment that abides by a labeling rubric in which any label occurs at most once per line; segments below take the label of the overlapping segment above; if one segment above overlaps more than one segment below, the first segment below gets the label from the segment above; if more than one segment above overlaps one segment below, the segment below takes the label from the last overlapping segment above.

The rubric enables exposing all spatial details of the region; also, labels designate unique areas of a region containing spatial details. Moreover, the rubric enables a very efficient hardware process. All of the necessary segment and label states are known at the end of each segment on the current line for labeling that segment. Therefore Feature Labeling can proceed as data arrives with one line of memory for buffering the label process.

Figure 16:
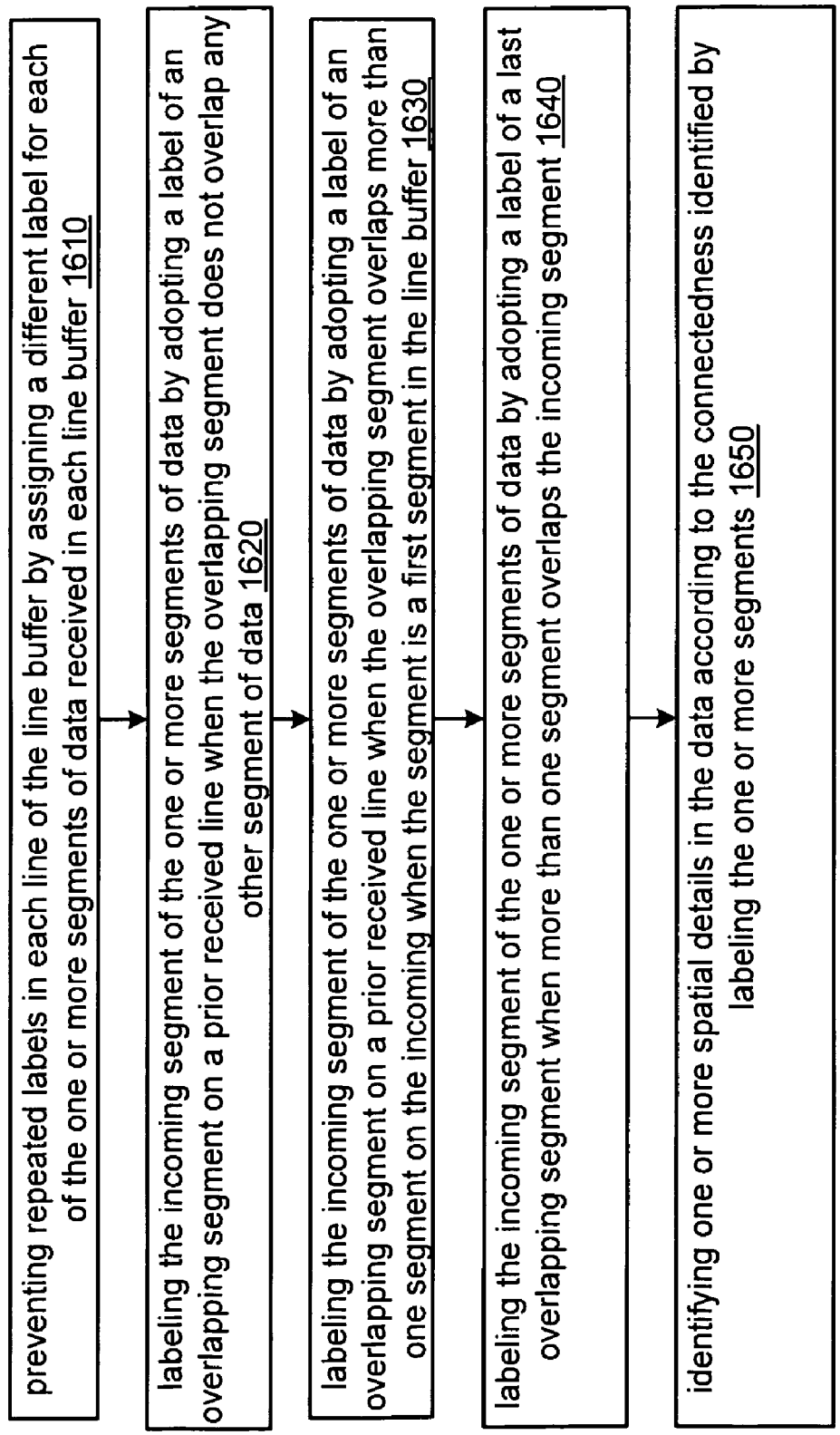
FIG. 16 is a flow diagram illustrating a method in accordance with an embodiment of the present invention.

Referring now to FIG. 16, the modified propagated last labeling method is illustrated that enables exposing of all spatial details of a region. Specifically, block 1610 provides for preventing repeated labels in each line of the line buffer by assigning a different label for each of the one or more segments of data received in each line buffer. Block 1620 provides for labeling the incoming segment of the one or more segments of data by adopting a label of an overlapping segment on a prior received line when the overlapping segment does not overlap any other segment of data. Block 1630 provides for labeling the incoming segment of the one or more segments of data by adopting a label of an overlapping segment on a prior received line when the overlapping segment overlaps more than one segment on the incoming when the segment is a first segment in the line buffer. Block 1640 provides for labeling the incoming segment of the one or more segments of data by adopting a label of a last overlapping segment when more than one segment overlaps the incoming segment. Block 1650 provides for identifying one or more spatial details in the data according to the connectedness identified by labeling the one or more segments.

The segments can be received from raster-organized data arrays wherein the data is image data arranged to display an image, and/or can be from an unbroken sequence of a data value organized horizontally on a raster line, and/or can be run-length encoded data and/or data encoded by a user-directed application.

For clarity, the convention will be to refer to "unique areas of a region containing spatial details" as "features." Labels therefore designate features.

FIGS. 17A and 17B illustrate how modified propagate last labeling according to an embodiment reveals feature locations via an illustration of extents of labels thereby illustrating how all of the features of region 1 are revealed. Specifically, FIG. 17A illustrated a prior art labeling that directs labels 1710 to Region 11720 via a prior art process that results in one region for the entire data array. In contrast, FIG. 17B illustrates a label buffer 173 that results in region identification 1740 with several features being made visible.

Figure 18A:
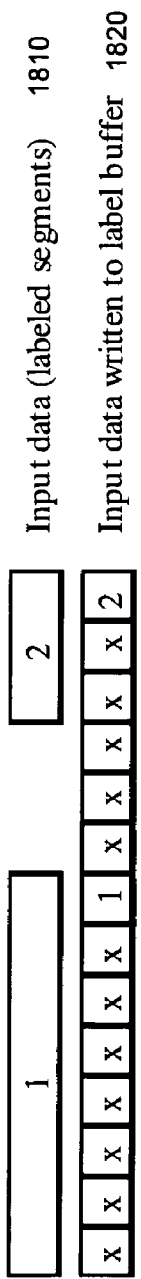
FIG. 18A illustrates data as input data written into a label buffer in accordance with an embodiment of the present invention.

Referring now to FIG. 18, a flow diagram illustrates how to process two lines of labels with a one line buffer. The line buffer data type will be suitable to the data being stored. Although the data may be stored in an RLE compressed format, for clarity purposes FIG. 18A illustrates data as input data that is labeled segments 1810 and input data as written into a label buffer 1820. For example, if the highest valued label can be recorded in one byte, then the line buffers could be bytes of memory with each byte representing a buffer location that corresponds to the spatial representation of a segment.

Various methods for representing and recording labeled segments to the buffer are within the scope of the present disclosure. For example, if the label for the segment is written in the last space of the buffer covered by the segment. In the figures, data in the buffer, "x" in the input data 1820 corresponds with data for which exact data does not matter as long as it is not a label that connects to neighboring segments.

Figure 18B:
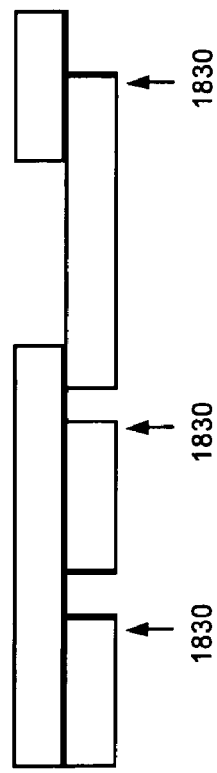
FIG. 18B is a diagram illustrating input data written to a label buffer and labeled segments in accordance with an embodiment of the present invention.

In accordance with an embodiment, the method of using propagate last labeling enables evaluation of segments as they arrive from the input data stream. Each segment is evaluated at the end of each segment 1830 as shown in FIG. 18B.

Figure 18C:
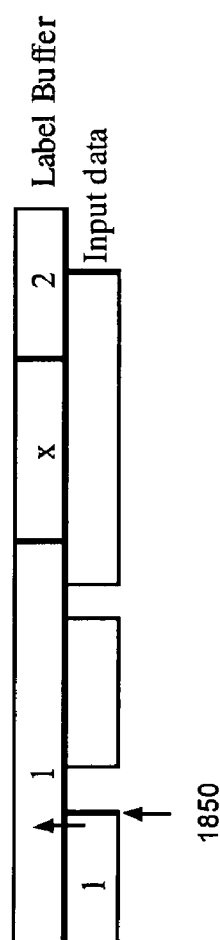
FIG. 18C is a diagram illustrating input data written to a label buffer as compared to input data in accordance with an embodiment of the present invention.

By the end of an input segment, all of the overlapping segments for that segment are known. Therefore, the label for the segment in the line above stored in the Label Buffer can be overwritten by the new label. In FIG. 18C, after a segment below is evaluated and labeled, the segment below can overwrite the segment above, as shown by arrows 1850.

As a result of the method, no valuable data in the buffer is overwritten. If the segment in the label buffer representing a segment in the previous line does not extend to the right of the current segment, then the segment above can not overlap with future segments. If the segment in the label buffer representing a segment in the previous line does extend to the right of the current segment, then the portion of the segment above that might overlap future segments is not overwritten.

Reducing Memory Requirements: Closing Features

For purposes of the present disclosure, a label designates a Feature structure that holds the region description (features). As long as a segment on the previous line connects to a segment on the current line, that Feature might still be updated with new information, so that label can be referred to as "open." According to an embodiment, the maximum possible number of open labels is the same as the maximum number of labels on a line. Correspondingly, the maximum number of labels on a line is the number of pixels on a line. If the segmentation process sets a minimum horizontal segment size, then the maximum number of labels on a line is (line width/min segment size). For example, the minimum segment size for a segmented image might be one pixel. Referring to FIG. 19, flow diagram illustrates a method that proves that only one label will occur on a line of a line buffer, whether operations are performed a line at a time or multiple lines at a time. The maximum number of labels on a line matches the number of pixels on the line. Specifically, FIG. 19 illustrates block 1910 which provides for designating a segment. Next, block 1920 provides for labeling the incoming segment of the one or more segments of data by adopting a label of an overlapping segment on a prior received line when the overlapping segment does not overlap any other segment of data. Block 1930 provides for labeling the incoming segment of the one or more segments of data by adopting a label of an overlapping segment on a prior received line when the overlapping segment overlaps more than one segment on the incoming when the segment is a first segment in the line. Block 1940 provides for labeling the incoming segment of the one or more segments of data by adopting a label of a last overlapping segment when more than one segment overlaps the incoming segment. Finally, block 1950 provides for identifying one or more spatial details in the data according to the connectedness identified by labeling the one or more segments. As noted, the modified propagated labeling method in accordance with an embodiment allows any particular label to occur at most once on a line. It has been discovered that if the segment on the previous line does not connect to a segment on the current line, it will never connect to another segment for the rest of the image. In accordance with an embodiment, the method takes advantage of the label limit. That segment's label will not be used again and the Feature it points to will not have any more segments added. A result that is counterintuitive is that if a segment on the previous line does not connect to a segment on the current line, the segment label and the Feature it points to can be "closed." There is no reason to maintain the storage of a closed Feature as that Feature will no longer be updated. The closed Feature can be output to whatever receiving process follows the CCL function. For example, the contents of the closed Feature can be written to a First-In-First-Out (FIFO) type memory. Thus, the closed feature can be immediately output to the receiving process, which enables reuse of the feature memory space to conserve memory.

Feature Encoding

According to an embodiment, an efficient method for collecting feature information is provided that uses a compact format for storing and communicating feature information. Specifically, feature encoding herein can include collecting feature information from the raw data, or from the labeled data, or from the region information, and representing that information in a format for collected feature information.

Using raw data enables networked sensors, e.g. cameras, that contain the processing required for communicating with other devices and computers on a network to efficiently pass information. The image processing required for scene understanding in networked cameras is limited by 1) the complexity of existing segmentation methods, and 2) the lack of a method for encoding region information, 3) the fact that each camera only has one viewpoint. Each camera has an isolated viewpoint and limited processing power. Without the feature encoding method disclosed herein, camera networks are forced to waste processing resources on compressing video images, and to burden the network with high-bandwidth pixel representations of camera views. It is currently expensive and difficult to track moving objects as they pass through different camera views. The feature encoding method herein is an efficient method for CCL/segmentation for each networked camera, a low-bandwidth format for communicating region information, and a way to combine the viewpoints of cameras on the network. Feature encoding makes low-cost distributed scene understanding possible.

The actual region property, such as the color red, can be encoded digitally as a number, for example if 42 denotes red, then (red(xmin, ymin, xmax, ymax)) may be represented in digital form as (42, 18, 735, 423, 1024).

The disclosed feature encoding encompasses the extraction and communication of both simple and complex characteristics. For example, a series of points marking the boundary of a region can be collected from the endpoints of the line segments, or the region boundary may be described by the coefficients and constants of splines or higher-order curves.

The encoding method herein encompasses various representations of region properties. For example a region texture may be represented digitally as wavelet constants and coefficients. Further, disparate region segmentations can be described. For example, a red colored region has an area that is smoothly textured and an area that is roughly textured (strong edges). An adjoining blue colored region has an area that is smooth and an area that is rough. The smooth areas are contiguous and the rough areas are contiguous. The encoded features may include the red region (blue(x1, y1, x2, y2)), the blue region (blue(x3, y3, x4, y4)), the smooth region (blue (x5, y5, x6, y6)), the rough region (blue(x7, y7, x8, y8)), or combinations such as (rough/blue(x9, y9, x10, y10)), etc.

According to an embodiment, feature encoding enables the communication of region information. For example, some interactions that are enabled by feature encoding include interactions between different parts of a system, networked computers, networked computers and networked sensors, and networked sensors. A machine vision camera on a network benefits from feature encoding to communicate to another camera on a network. For example, "do you see the red ball at location (x1, y1)?" The response from the second camera to the first camera might be "no, I see blue ball at (x1, y1) and a red ball at (x2, y2)." Feature encoding allows local processing of images by networked cameras that share portions of the same view. For example, two cameras observing the same room can communicate to one another the encoded feature information of their respective views, and thereby construct a 3D representation of objects in the room.

Figure 20A:
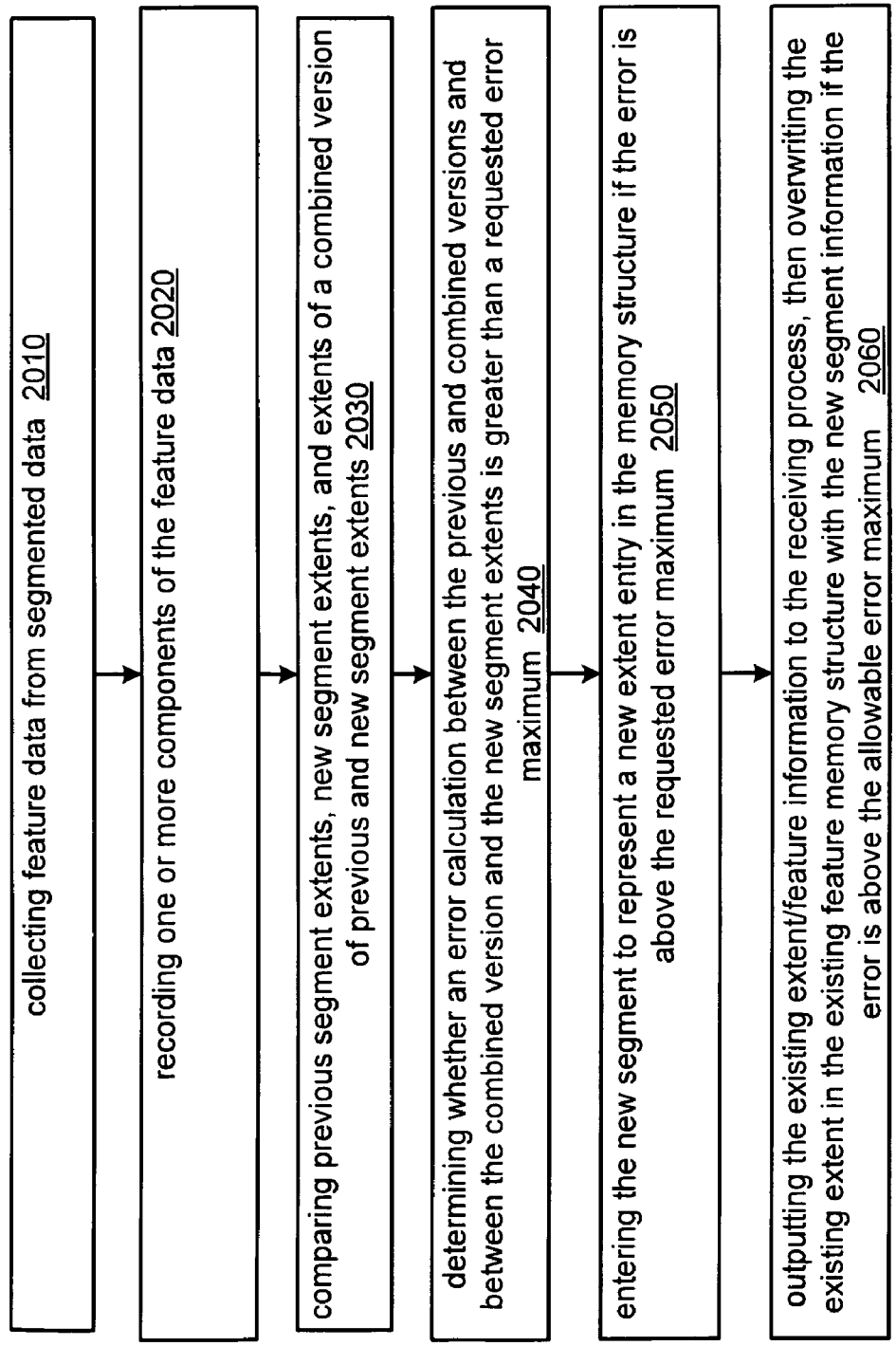
FIG. 20A is a flow diagram illustrating a method in accordance with an embodiment of the present invention.

Referring to FIG. 20, a flow diagram illustrates a method for feature encoding that is based on raw data formatted as a 1D, 2D, or 3D data in an array. In one embodiment of the method, feature encoding is used to communicate region information in a standardizable format. For example, region properties such as color can be recorded with spatial information in a standardized format. When communicating region data, features are used to represent the region. For example, region features includes coordinates and region properties such as can be described as a extent x and y in a dimension with the region property of color.

Block 2010 provides for collecting one or more details from segmented data, either as the segmented data is received from a source or transferred from a secondary source. In one embodiment, the collecting can include collecting data line segments in raster order during Modified Propagate Last Labeling. The collecting can also include collecting details with or without prior segmentation, as in the case of filtered data instead of segmented data. As the input data is received, a memory structure can be configured to record one or more components of the feature data. Thus, block 2020 provides for recording one or more components of the feature data.

The hierarchical memory structure, according to an embodiment, determines the amount of detail to retrieve and/or record by analyzing and combining extents of a segment with previous segments for a given feature.

Block 2030 provides for comparing previous segment extents, new segment extents, and extents of a combined version of previous and new segment extents. Block 2040 provides for determining whether an error calculation between the previous and combined versions and between the combined version and the new segment extents is greater than the error maximum requested.

Block 2050 provides that, in accordance with the maximum error calculation, entering the new segment as representing a new extent entry in the memory structure if the error is above the requested error maximum. Block 2060 provides for outputting the existing extent/feature information to the receiving process, then overwriting the existing extent in the existing feature memory structure with the new segment information if the error is above the allowable error maximum. The maximum error calculation allows feature representation precision to be maintained on a segment by segment basis and the corresponding data rate remains consistent to maintain the precision.

As one skill of the art will appreciate, inputs that are independent of segments, such as a single data value or the like, can be precisely maintained at a consistent data rate on a value by value basis.

In one embodiment, feature encoding includes a standardizable method whereby features representing regions are recorded in a language compatible or parallelizable with extensible markup language (XML) or other internet appropriate protocol and/or MPEG 7.0. XML and/or an independent internet capable communication language can provide user-defined structures and/or structures in accordance with embodiments herein for communicating many types of feature information between computers, and can be modified or expanded upon to include methods for communicating features in accordance with embodiments herein to assist in enabling ubiquitous feature encoding. Alternatively, feature encoding can be independently communicated with a protocol utilizing embodiments described herein.

In one embodiment, feature encoding described herein covers region properties e.g. a red area has a boundary and location, a smooth area has a location and boundary, shape, size and area and volume. Boundaries can be described different ways, via extents, curves and/or polynomials. Thus, one method for encoding features for machine vision is to record a property of the object and extents for the object.

Figure 20B:
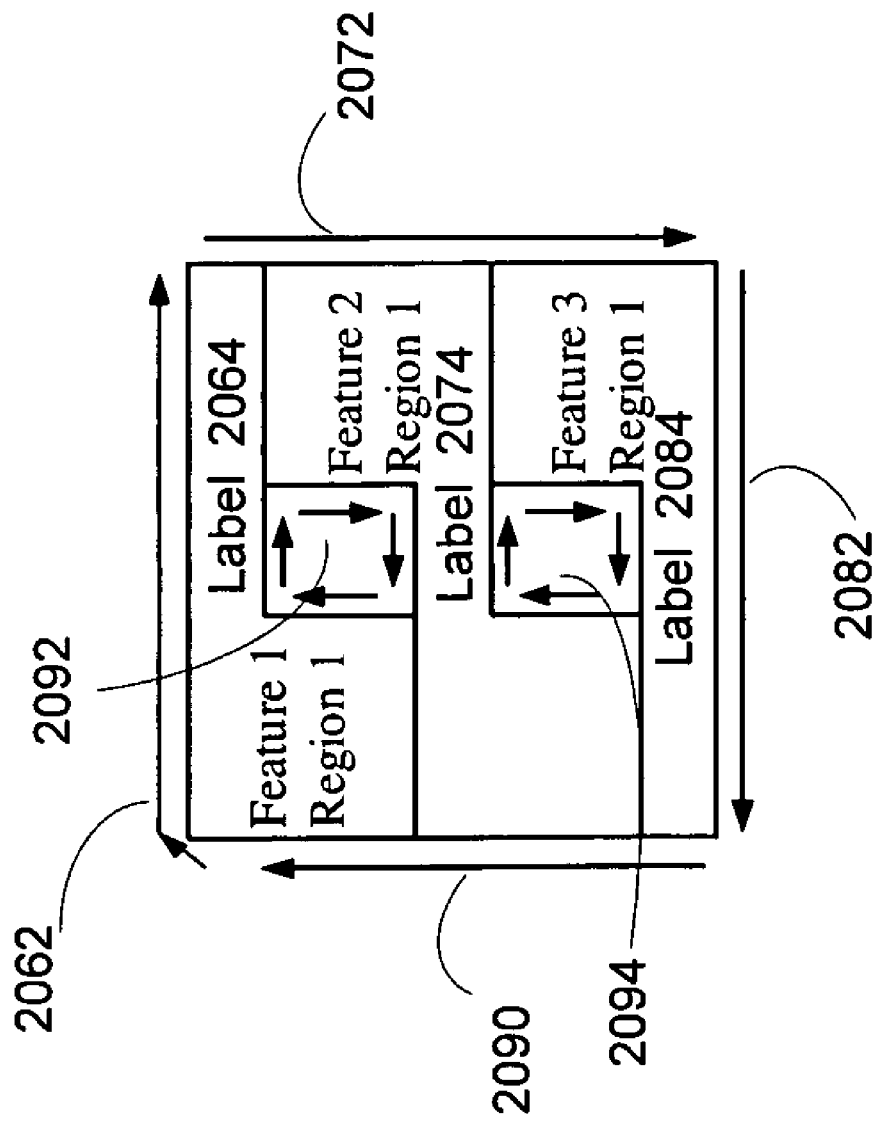
FIG. 20B is a diagram of data and directional flow of processing in accordance with an embodiment of the present invention.

Referring to FIG. 20B, a schematic diagram illustrates a method for determining internal and external contours from the feature extents. In the embodiment, boundary points are determined once, independent of pixel searching.

More specifically, for an external contour, the top extent of the root label starting with line 2062 provides the first three points 2064 of a border chain: top left, top, and first top right. Next, the method includes following line 2072 down the right side of label 2064 extents down until the extent reaches a same-region neighbor, region 1, feature 2, label 2074. Thus, extents are already grouped by region and extent endpoints are used as the boundary of the region, Arrow 2072 follows the right side of label 2074 extents down to label 2084, feature 3, region 1. Following line 2082, the method provides for determining border chain points for label 2084, feature 3, region 1. Line 2090 determines more border chain points for feature 2, region 1 and label 2074 and then more border chain elements for feature 1, region 1, label 2064. As one of skill in the art will appreciate, the method can determine border chain points and contours in other directions, either clockwise or counter-clockwise.

One method is directed to following the right side of a data representation down for subextents above, following the left side of the data representation up for subextents above, looping around the top or bottom of a subextent until a neighbor is encountered, flagging the endpoints of extents as they are taken for the external contour.

For the case of neighbor encountered at a mid-extent the subextents can be found for a neighbor below, followed by left extents up. Next, subextents for neighbor above can be found, followed by right extents down.

FIG. 20B also illustrates internal contours 2092 and 2094. For internal contours, a method includes finding an unflagged extent and process connected unflagged extents. In one embodiment, the method can be reversed from outside extents, by determining a neighbor above and following extents up a right side. The internal contours can also be found by following according to rules similar to outside extents. Thus, for both internal and external contours, the method provides for determining contours as a function of a precision for extent resolution.

The property and extents can include constants and coefficients for polynomials for curves. The boundary information is thus capable of being extracted via a simple memory structure and the encoding for using the memory structure. Boundaries that include curves can use the memory structure to record polynomials. By creating a extensible memory structure, simple extents and boundaries can be expanded upon to extract actual curves and shapes from the extents. In one embodiment, the memory structure enables a precision control system that allows a user or application to set an error control to determine the amount of information necessary or amount of representation necessary for other applications and the like. For example, some applications would require a single set of extents of a subset of an area instead of a whole area.

Thus, the method is compatible with raw data formats and the CCL labeling methods disclosed herein and is efficient for hardware and software implementations. Further, a compact representation of a feature is provided. For example, a color subregion can be described as (red(xmin, ymin, xmax, ymax)).

Advantageously, the encoding is flexible. For example, the encoding is compatible with 1D, 2D, and 3D spatial details as exposed by Propagate Last Labeling methods in accordance with embodiments. Thus, the encoding produces a simple standard format for communicating feature information to other systems.

Figures 21, 22A:
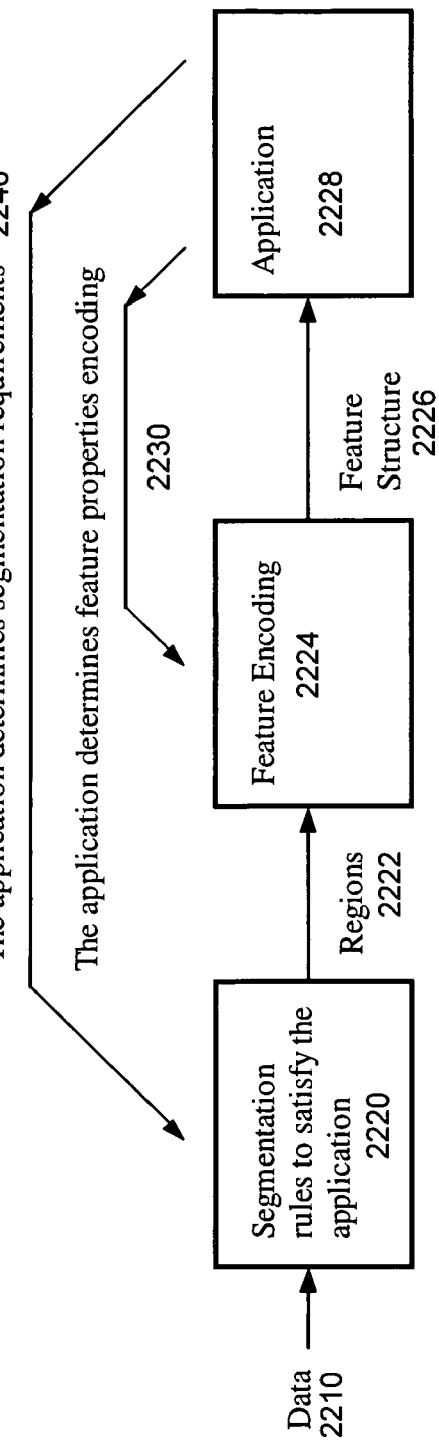
FIG. 21 illustrates exemplary data structures in accordance with an embodiment of the present invention.
FIGS. 22A and 22B are schematic data flow diagrams illustrating data flow in accordance with an embodiment of the present invention.

Referring now to FIG. 21, a digitized version of the encoded feature is illustrated. The bracketed (<...>) material such as label 2110, property 2120, and boundary 2130 represent numerical values illustrate an encoding. For example the color "red" could be represented by the number "2." In one embodiment, region properties vary according to the needs of the application. For example, a banana-sorting machine needs to determine yellow and green regions, while a golf-ball counting machine needs to determine circular regions.

Referring now to FIG. 22A a diagram illustrates how data region properties and encoding are determined by the application requirements. An application can set up the segmentation rules 2240 and the appropriate property encoding 2230 so that the feature encoding function can extract and package the region features. Prior art methods rely on some sort of boundary function or the like to determine region features. Therefore, under prior art methods, the region description provides the region properties and the methods for segmentation. Likewise, region representation in the prior relies on region boundary calculations requiring chain of pixel coordinates and exhaustive pixel searching to determine region membership. In contrast, embodiments described herein describe regions, region properties, and segmentation wherein region representation and features are represented by precision extents and region properties. Thus, when a boundary is required, a boundary can be efficiently determined from extents. More specifically, data 2210 is received by block 2220 that applies segmentation rules to satisfy an application. Next, regions 2222 are output to feature encoding block 2224. Feature structure 2226 is output to application 2228. Application 2228 interacts with both feature encoding block 2224 to determine feature properties encoding 2230. Also, application 2228 determines segmentation requirements 2240.

Figure 22B:
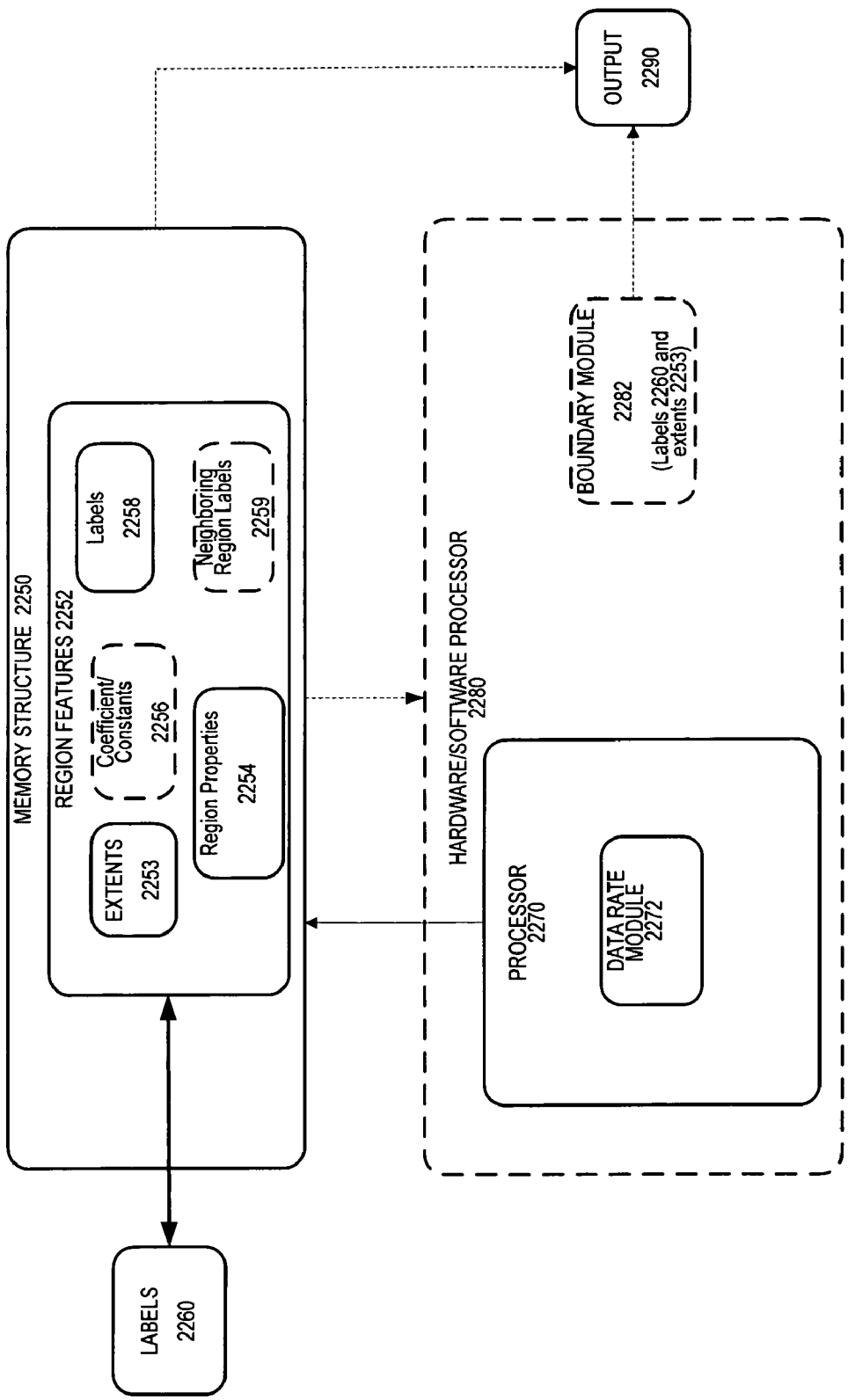

Referring now to FIG. 22B, a connected component labeling system for feature encoding exemplifies an embodiment including a memory structure 2250 configured to be associated with one or more labels 2260 for an object. The system can include further memory structures for the object as required to fully and precisely describe the object.

The memory structure 2250 is an exemplary memory structure and includes one or more region feature 2252 configured to be stored in the memory structure 2250 which could be in raster order to provide a spatial correspondence between the memory structure 2250 and an original location of the object. The region features 2252 includes one or more extents 2253, labels 2258 which function as labels to provide further information about the object, region properties 2254, and optional coefficients/constants 2256 and optional data concerning neighboring region labels 2259. Optional data can be provided such as further region properties, region features, extent information and the like as required by system requirements and the type of object being considered.

The connected component labeling system also includes a hardware/software processor 2289 coupled the memory structure 2250. Disposed within the processor 2250 processor 2270 and data rate module 2272 coupled to the memory structure 2250 to enable the memory structure 2250 to receive one or more extents of the one or more region features 2252 at an adjustable precision and with an adjustable data rate, the adjustable precision and the adjustable data rate are determined as a function of an amount of detail to be stored in the memory structure 2250. Extents 2253 can be adjustable and can be transferred back and forth between memory structure 2250 and processor 2270. Extents can be controlled by the precision determination created by a user and/or application coupled to the system.

For purposes of the disclosure herein, extents include any defining designation of a boundary box around a selected area of a region. For example, if the extent exactly matches the shape of the selected area it is "high precision." Conversely, if the extent has no relation to the actual shape of the selected area, but still contains the selected area, the extent has "low precision." Embodiments herein include "adjustable precision extents," for which a user, application or other selection vehicle selects the desired precision of region extents, and therefore controls the degree to which the extents represent the actual shape and location of a region. In the embodiment, more extents will accurately represent more complex shapes, and a user thereby also controls the data rate of the output from the feature encoding. Fewer extents will less accurately represent shapes.

Adjustable precision extents give the best region representation in simple extent form for a selected data rate, because as long as the level of extent precision is satisfied, no unnecessary extents are generated.

Accordingly, disposed within hardware/software processor 2280, boundary module 2282 is shown coupled to the memory structure 2250. Boundary module 2282 can be hardware built with feature encoding or be a separate process operated on another computer or the like. Boundary module 2282 is configured to extract the one or more region features 2252 as identifying a boundary of a region through the use of extents. Boundary module 2282 collects the boundary coordinates of a region from the feature extents instead of the region pixels. Because the feature extents are the outer coordinates of a region, they naturally provide an efficient representation of boundary. No costly pixel searching is required as in other methods. As shown in memory structure 2250, region features 2252 can include one or more of coefficients and/or constants 2256 descriptive of the boundary, boundary module 2282 can combine the one or more region features 2252 as necessary to form an output 220. Boundary module 2282 can also output labels 2260 and extents 2253 to output 2290.

In one embodiment, the boundary module 2282 is configured to determine the boundary using a chain of border coordinates, the chain of border coordinates derived from the one or more region features 2252.

In another embodiment, data rate module is configured to receive the adjustable precision from a user or an application coupled to the connected component feature encoding system, as shown in FIG. 23. The data rate module can also be configured to reference adjustable precision extents from the labels in a spatial order as a function of a location of the one or more objects in an image.

Referring now to FIG. 23, a network example is illustrated. More specifically, FIG. 23 illustrates that embodiments herein can be used in different scenarios. In some embodiments, system requirements may dictate the use of cryptographic methods. Video cameras attached to computer networks are susceptible to the same unwanted intrusion, disruption, and misuse as any device on a network. To ensure the security of camera data, the normal approach is to encrypt whole images. Encryption is a very time consuming and processor demanding process. Embodiments herein, such as feature encoding, enable transmitting only the information required by an application instead of the whole image. Thus, the image data sent over a network and cryptographically sealed could be a fraction of what is typically sent.

The demands made on the system for encryption are kept to an absolute minimum. The system processor can be less expensive. The complete system cost is reduced while performance is improved. Also less information is exposed to the network, which means there is less data that can be used to break the encryption scheme.

Referring now to FIG. 23, wired or wireless connection 2340 can be a cryptographically protected transmission if required by system requirements. In one embodiment, each of the communicating applications can be compatible applications with compatible property encoding. As shown, Application 1 2310 can be networked to application 2 2320 and application 3 2330 via a wired or wireless connection 2340. For example, Application 3 can request that App. 2 and App. 3 perform color segmentation and encode "red" as "2." Thereafter all three applications can communicate features. Also some standard property encodings may be previously known by applications on the network.

Precision Features

Figure 24:
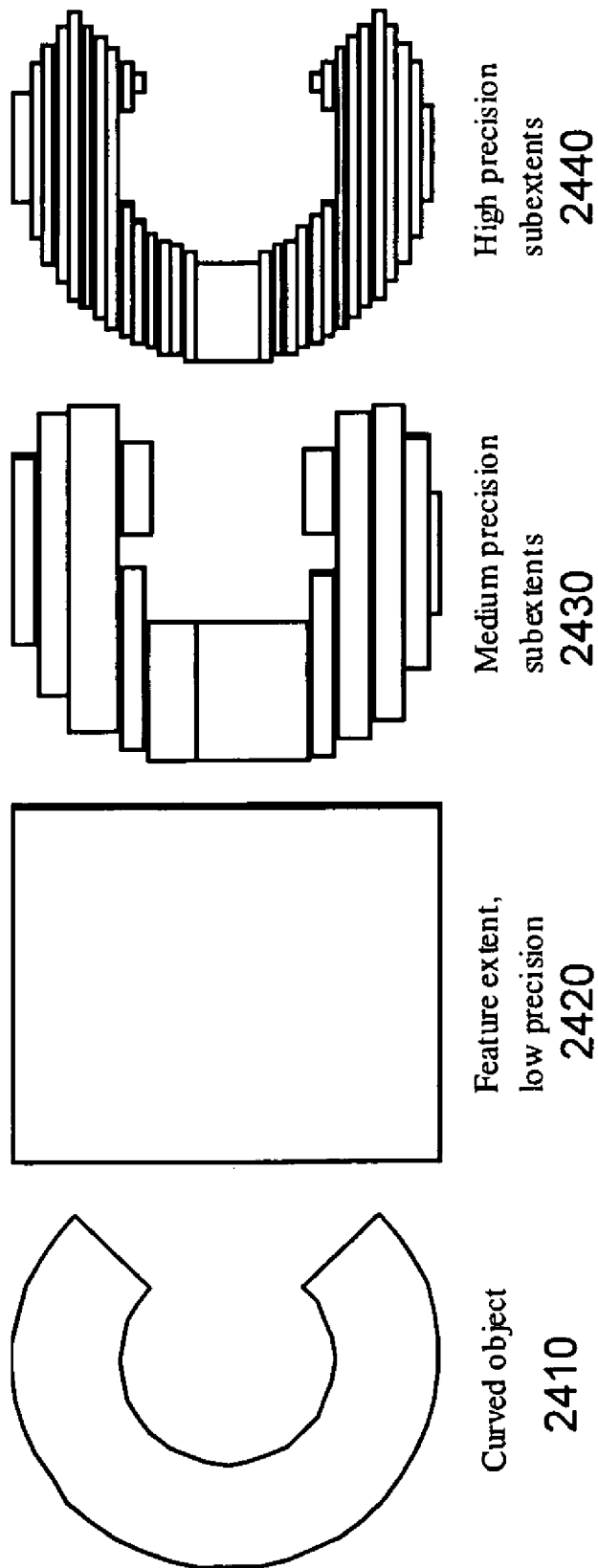
FIG. 24 is a sample precision based connected component example of a method in accordance with an embodiment of the present invention.

Region features are captured as the segments arrive from either the segmentation process or from an appropriate data source. The region maximum and minimum boundaries comprise the extents of the region, represented by a box showing the max-min boundaries, as shown in FIG. 24. Region features are comprised of groups of segments, defined by sub-extents. FIG. 24 illustrates that curved object 2410 can be interpreted by features with a low precision 2420 resulting in a square, a medium precision 2430 resulting in a coarse object, or a high precision resulting in a segmented version of the curved object 2440. Some features, such as shape, vary within the subextent. The larger the group of segments within a subextent, the more inaccurate the feature representation as shown in 2440. But the smaller the extent, the more data that must be recorded and transmitted to the receiving process. Therefore, the precision required of the features should determine subextent size. Lower precision produces less feature data and a more compact representation of a region. Higher precision allows a more accurate representation of the feature. For example, for text recognition, the shape of letters will be important. For counting letters, only the full extent of each letter is required.

A "feature closed flag" is included in the feature structure. When the feature is output to the receiving process, the flag signifies whether this is the last subextent for the feature. If the feature is closed, the next time a feature with the same label is output it will be a new and distinct feature. If the feature is not closed, the next feature with the same label will be the next subextent for this feature.

Precision feature encoding consumes no extra memory because each feature subextent is output when the precision threshold is reached. But the "feature closed flag" is not set. The next feature subextent is written to the same feature structure with the same feature label.

Figure 25:
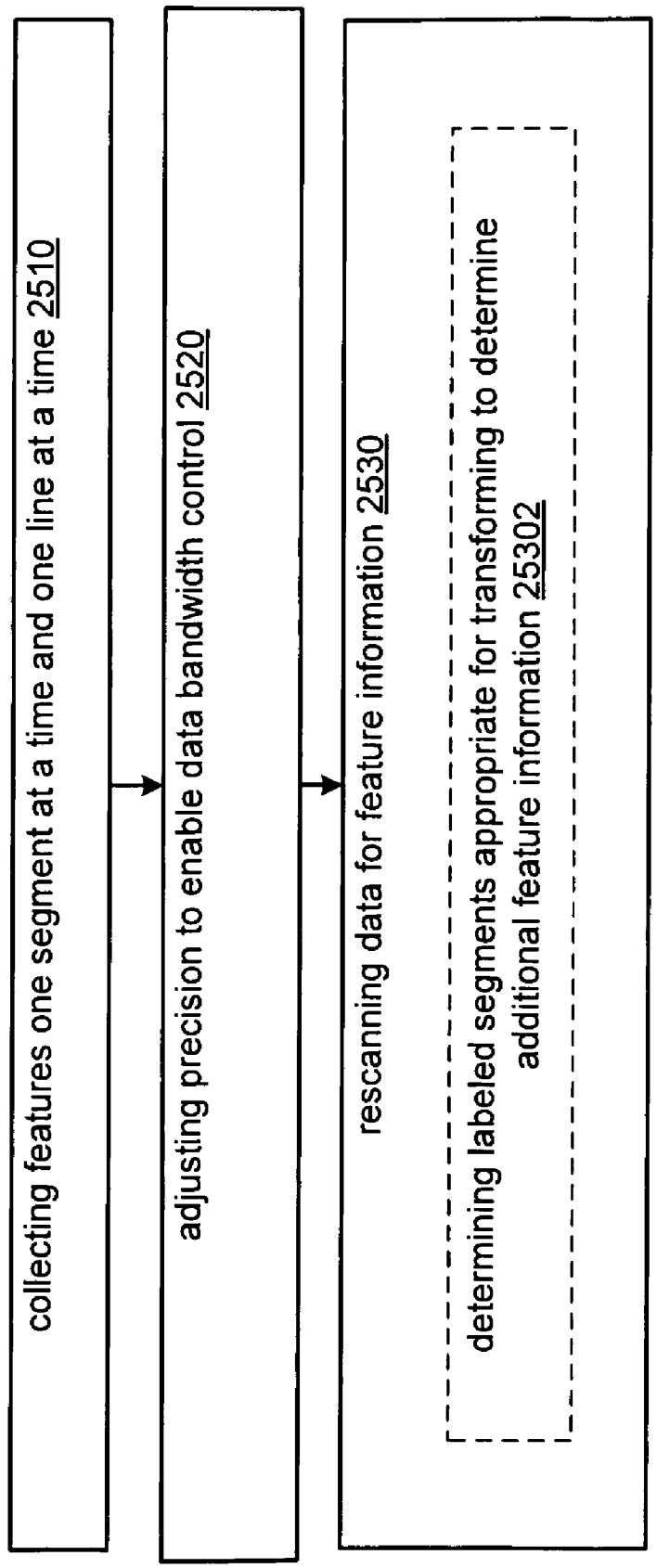
FIG. 25 is a flow diagram illustrating a method in accordance with an embodiment of the present invention.

Referring now to FIG. 25, a method for features is illustrated. Block 2510 provides for collecting features one segment at a time and one line at a time. Block 2520 provides for adjusting precision to enable data bandwidth control. Block 2530 provides for rescanning data for feature information.

Disposed within block 2530 is block 25302 which provides for determining labeled segments appropriate for transforming to determine additional feature information. Specifically, some data qualities may not be captured during segmentation. Although data labels and region information for segments are processed into features, the equivalent raw data locations can be processed and the needed data qualities added to features. For example, desired feature information for an image may include complex texture qualities. The image data locations corresponding to the labeled segments is rescanned and transformed to spatial/frequency coefficients and saved to the appropriate feature.

Note that raw data may be used in the segmentation process, so that some buffering of the raw data could have occurred or be required in accordance with system requirements. Precision features allow the user to adjust the data rate from CCL to suit the application. Motion detection would only need large extents, which produce a low data rate. Object recognition may need smaller extents for more feature information, which would generate a higher data rate. Precision features and a variable data rate make this new CCL technology suitable as the pre-processor for the full range of host processors, from 8-bit embedded microprocessors to 64-bit computers.

Multi-dimensional Labeling

Referring to FIG. 26, an embodiment is directed to multi-dimensional labeling for connected component labeling. Specifically, connected component labeling could apply to three-dimensional data such as two-dimensional data arrays that change with time. Further, three-dimensional connected components labeling could apply to volume images such as CAT (Computer-assisted tomography) scans, and time series data such as object tracking in video. A method for processing three-dimensional data meets a need for solutions that require less processing power, less memory, and creates less of a burden on communications such as networks, for industrial, robotic, and security applications.

According to an embodiment, a three-dimensional kernel can be applied to CCL, data segmentation, and feature encoding. More specifically, a three-dimensional kernel according to an embodiment enables three-dimensional CCL, data segmentation, and feature encoding. Input data in a three dimensional format can be assigned region membership as the input data arrives from a source. Input data can be received at a frame buffer and/or memory array sufficient to hold a input data array.

Only one frame buffer (memory array sufficient to hold one whole input data array) is required in addition to the line buffer of the two-dimensional method. For a given frame buffer of fixed size, there is no limit to the size of regions that can be segmented, CCL, or feature encoded in the dimension perpendicular to the two dimensional frame buffer. For example, regarding tracking objects, a third dimension could be a time dimension enabling infinite time tracking of objects with no further demand on memory resources over a time-limited tracking scenario.

As described above, connections that are made by connected component labeling are maintained by methods described above relating to yMax, arbitrary labeling, label queue, and feature encoding and closing. According to an embodiment, a minimum three dimensional kernel enables three dimensional connected component labeling in a single frame buffer. Unlike known three-dimensional methods which require multiple frame buffers, the methods disclosed herein enable single frame buffer, single pass labeling. For a given frame buffer of fixed size, in an embodiment there is no limit in the size of regions that could be segmented, subject to CCL, and/or feature encoded in a third dimension.

Three-dimensional arrays of data are analyzed in applications that include volume images such as CAT (tomography) scans, and time series data such as object tracking in video.

Figure 26B:
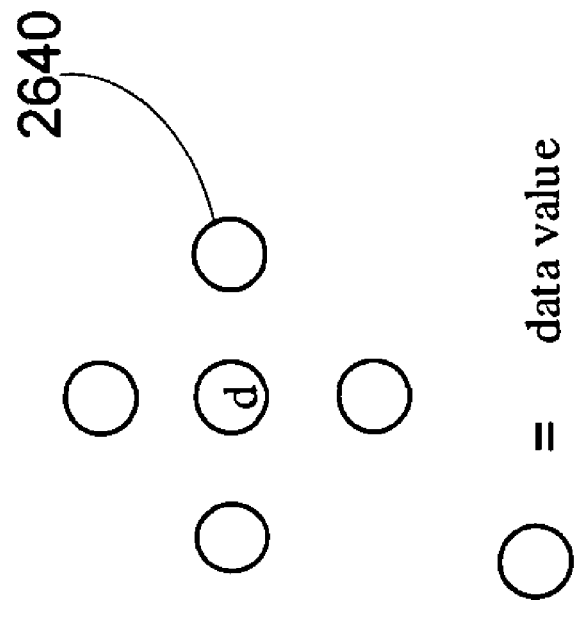
FIG. 26B is another two-dimensional array including a center data value illustrating a minimal number of data values for performing dimensional connected component labeling in accordance with an embodiment of the present invention.
Figure 26A:
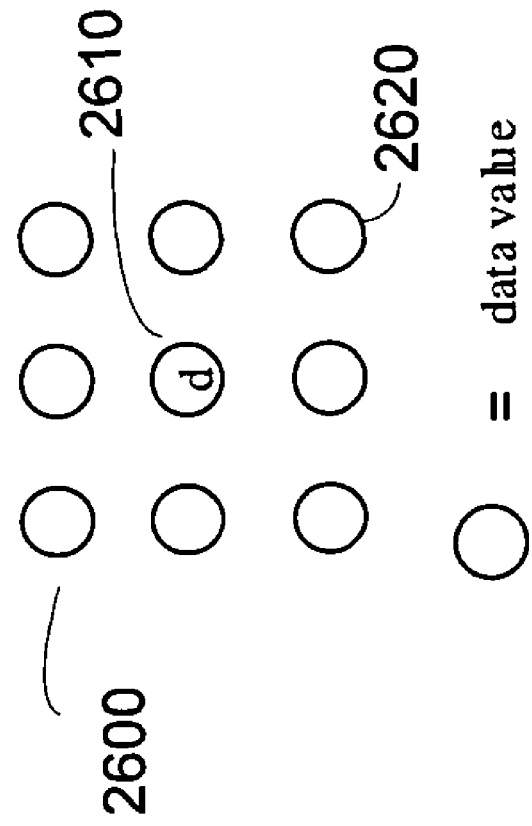
FIG. 26A, labeled "prior art" is a two-dimensional array including a center data value illustrating a prior art method for dimensional connected component labeling.

Referring now to FIG. 26A, labeled "prior art", an arrangement of data 2600 in a 2D array illustrates data element "d" 2610 with adjacent data locations. Previous CCL techniques operate on a kernel centered on "d" 2610 and require the eight neighboring locations including corner locations 2620. Referring to FIG. 26B, disclosures herein demonstrate that that data relationships sufficient to perform connected component labeling on a two dimensional array are established using a four way kernel as illustrated in array 2640. CCL on a two-dimensional array are contained in the 4-way kernel 2640. The array can include pixel value, data value, region label, or feature label data as may be output by an application. For purposes of the present disclosure, "array elements" refers to such data and could include arrays of pixel values, data values, region labels, or feature labels. Thus, the term "array element" includes such alternatives.

Referring now to FIG. 27, a further view of a two-way kernel 2700 exemplary of array element comparison or data value comparison (edge) processing is illustrated. As shown, two-way kernel processing can be limited to the processing of edges 2720 e1 and e2, and are sufficient to process every data location. Other neighbor values are included by virtue of region membership as determined according to embodiments herein, and do not need to be directly processed again.

Figure 28:
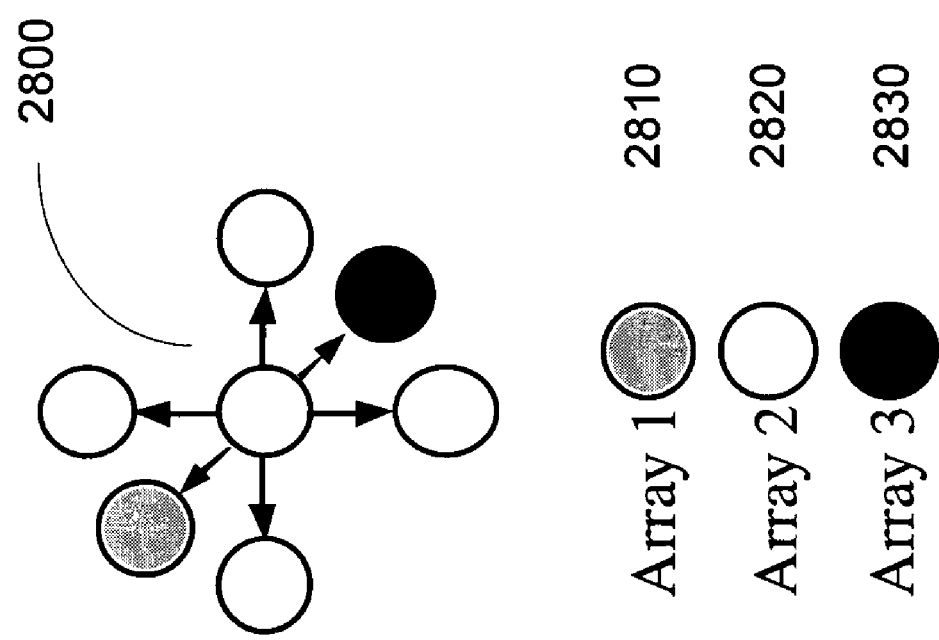
FIG. 28 is a diagram of an exemplary three-dimensional kernel capable of performing connected component labeling in accordance with an embodiment of the present invention.

Referring now to FIG. 28, three dimensional array 2800 of data has data elements with added "in front of" 2810, and "behind" 2830 the original two-dimensional array 2820. Without considering diagonal directions, according to an embodiment, a minimum kernel can include the minimum number of neighbors for a central data element as shown. The additional two edges 2810, 2830 will provide all of the connections required for labeling in accordance with embodiments.

Figure 29:
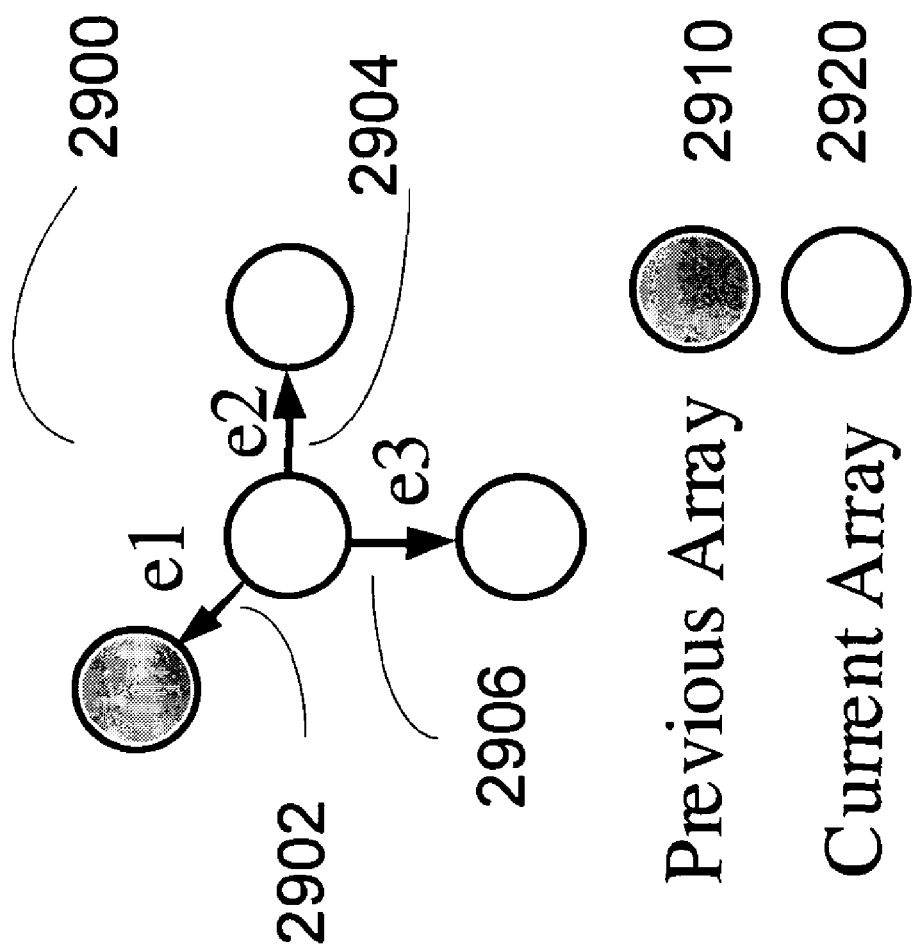
FIG. 29 is a diagram of a minimum connection kernel required to perform three-dimensional connected component labeling in accordance with an embodiment of the present invention.

Referring FIG. 29, a schematic diagram 2900 illustrates how a minimum kernel can operate such in a line buffer to extend CCL to include three dimensional neighbors, from a previous array 2910 and a current array 2920. Three edges e1 2902, e2 2904, e4 2904, are sufficient to perform three-dimensional CCL. The three edges representing data element comparisons or differences are e1 2902 current array kernel center vs. previous array kernel center; e2 2904 current array kernel center vs. data element or label to the right; and e3 2904 current array kernel center vs. data element or label below the center. The three edges cover possible connections between data in the three dimensional array as the kernel is moved across the data.

All previous connection states are maintained by yMax and other methods described above. More specifically, region root selection takes into account a third dimension. For example, when comparing two labels, the root might be selected to be the "earliest" data in the (x, y, z) coordinates. Also, the label list and region information as described for two dimensions is maintained in accordance with an embodiment for regions that extend through the sequence of data arrays.

For methods described above related to yMax, certain changes are necessary to describe "yzMax," the yMax of the zMax, a coordinate for a three-dimensional data array. A root yzMax entry designates the last data array element of a region (i.e., the yMax of the zMax coordinate) containing a label pointing to that root. Y and z coordinates are derived from the corresponding data array y and z coordinates. Newer successive frames of data are identified by increasing z values. Referring back to FIG. 10, as described above, an embodiment is directed to creating label chains by successive merge operations on roots designated by labels found at buffer locations with decreasing ((y*w)+x) values. According to an embodiment, merge operations in three dimensions includes linking the label of one region to the label of another region so that one region is considered "root" which is indicated by the label at buffer location min[x+(w*y)+(w*h*z)], wherein y represents a row value, x represents a column value, w represents a width value (total number of columns), and h represents a height value (total number of rows). Newer successive frames of data are identified by increasing z values. The label for the root region points to the memory structure that contains the metrics and properties for the merged regions. A three-dimensional merge includes merges between regions in adjacent two-dimensional arrays. The maximum number of labels required for three-dimensional connected component labeling is estimated by taking into account the number of data elements in one two-dimensional array then adding the number of data elements in the line buffer and adding the number of regions expected to extend in the third dimension through the line buffer plane.

During connected component labeling and segmentation, according to an embodiment, the number of labels required is expected to be much lower. Arbitrary labeling and label queues can be applied as in a two-dimensional case described above.

Therefore the regions merged in the two dimensional and three dimensional directions by the three dimensional kernel will have unique labels pointing to available region memory structures.

Likewise, in a three dimension system, a three dimensional system and method includes attaching a location value to every label to record the maximum y extent in the maximum z extent ("yzMax") of the label's region, yzMax=(y, z) at max[y+(h*z)] for the region.

For a three dimensional system an embodiment includes comparing yzMax for each root when two roots or more are compared during Union-Find or the equivalent and selecting the larger valued yzMax, then updating a new root result. Likewise, if a label is not root, then it is part of a chain of labels; and reusing the label in three dimensions can be accomplished by returning the label to the queue if the region yzMax=(y+(h*z)), where y and z are derived from the current (y, z) coordinates associated with the buffer top row.

Other neighbor values are included by virtue of region membership, and do not need to be directly processed again. The already processed data array memory locations can be closed according to embodiments herein. Thus, each edge does not need to be processed more than once, thereby enabling a minimum kernel 2900. The minimum kernel according to an embodiment extends the line buffer according to embodiments herein to include a frame buffer to hold data in a Z direction so that three-dimensional CCL can be performed with only a single frame buffer and a line buffer.

Figure 31:
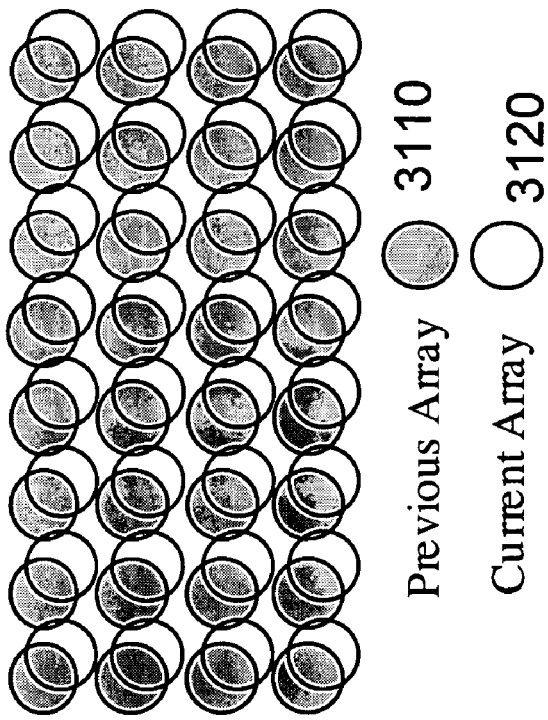
FIG. 31 is a diagram illustrating an exemplary relative alignment between two different two-dimensional arrays separated by a quality of a third dimension in accordance with an embodiment of the present invention.
Figure 30:
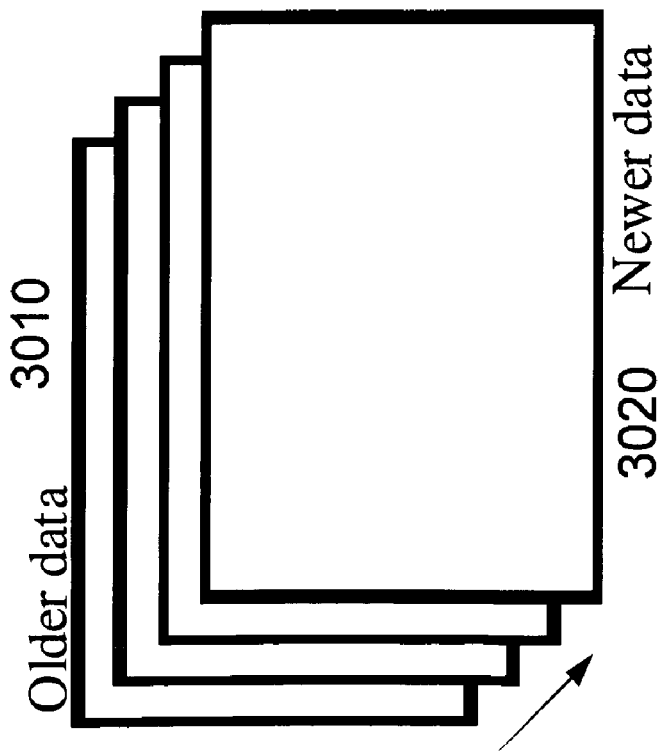
FIG. 30 is a diagram of a sequence of two-dimensional arrays, the sequence representing a third dimension in accordance with an embodiment of the present invention.

Referring now to FIG. 30, a representation of successive data arrays 3010 and 3020 are shown as they are input to the segmentation/CCL process. Data presented in a third dimension as successive data arrays such as yearly financial data, motion video images, or CAT scan images require a three dimensional CCL technique to segment the volumetric information. Accordingly, referring to FIG. 31, volumetric data is shown as two arrays 3110 and 3120 of raw data or data labels pointing to region information.

Figure 32:
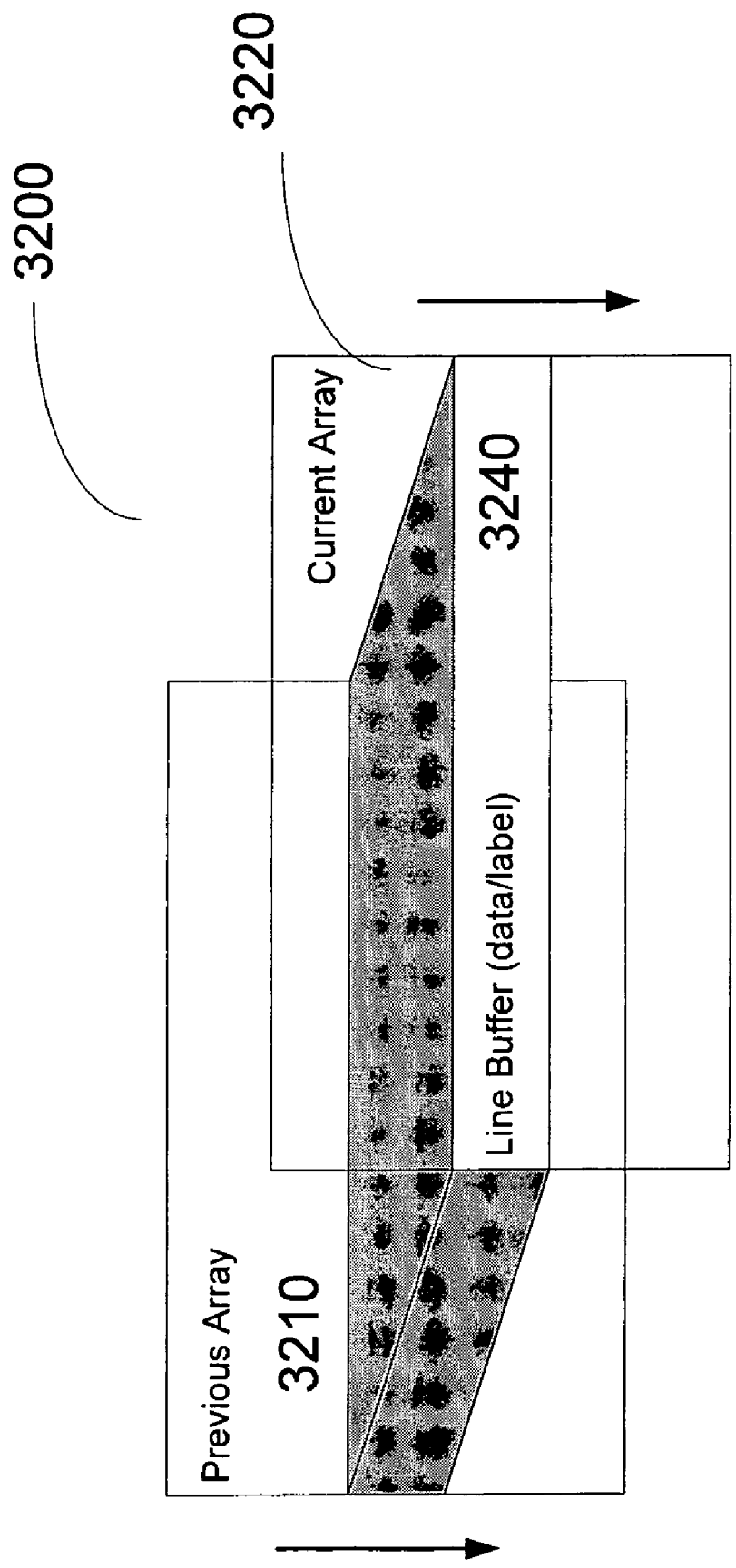
FIG. 32 is a diagram illustrating a sequence of two-dimensional arrays, the sequences separated by a third dimensional quality stored in a label/data buffer in accordance with an embodiment of the present invention.

Referring to FIG. 32, operative example 3200 is shown with two arrays 3210 and 3220 stored in memory. Arrows show the apparent change in position of the Line Buffer (3240) over the arrays. Line buffer 3240 processes the data as in a two dimensional case, except that line buffer 3240 uses a three-dimensional kernel and includes the corresponding area of data and or labels from the previous data array. Thus, according to an embodiment, the only data or labels that need to be preserved for future use are above the line buffer in 3240 in the current array 3220 and below the line buffer 3240 in the previous array 3210. The previous array 3210 is already effectively buffered by being stored in memory, so the line buffer 3240 need only store the data required for immediate access at position 3240, and/or the current data 3220 that is delayed until there is room in memory. Line buffer 3240 can include storage for raw input data as it undergoes a CCL or segmentation process conversion to data labels or region labels. In one embodiment, line buffer 3240 is a single line buffer that has access to current and previous data, labels, etc. via a three-dimensional kernel in accordance with an embodiment.

Figure 33:
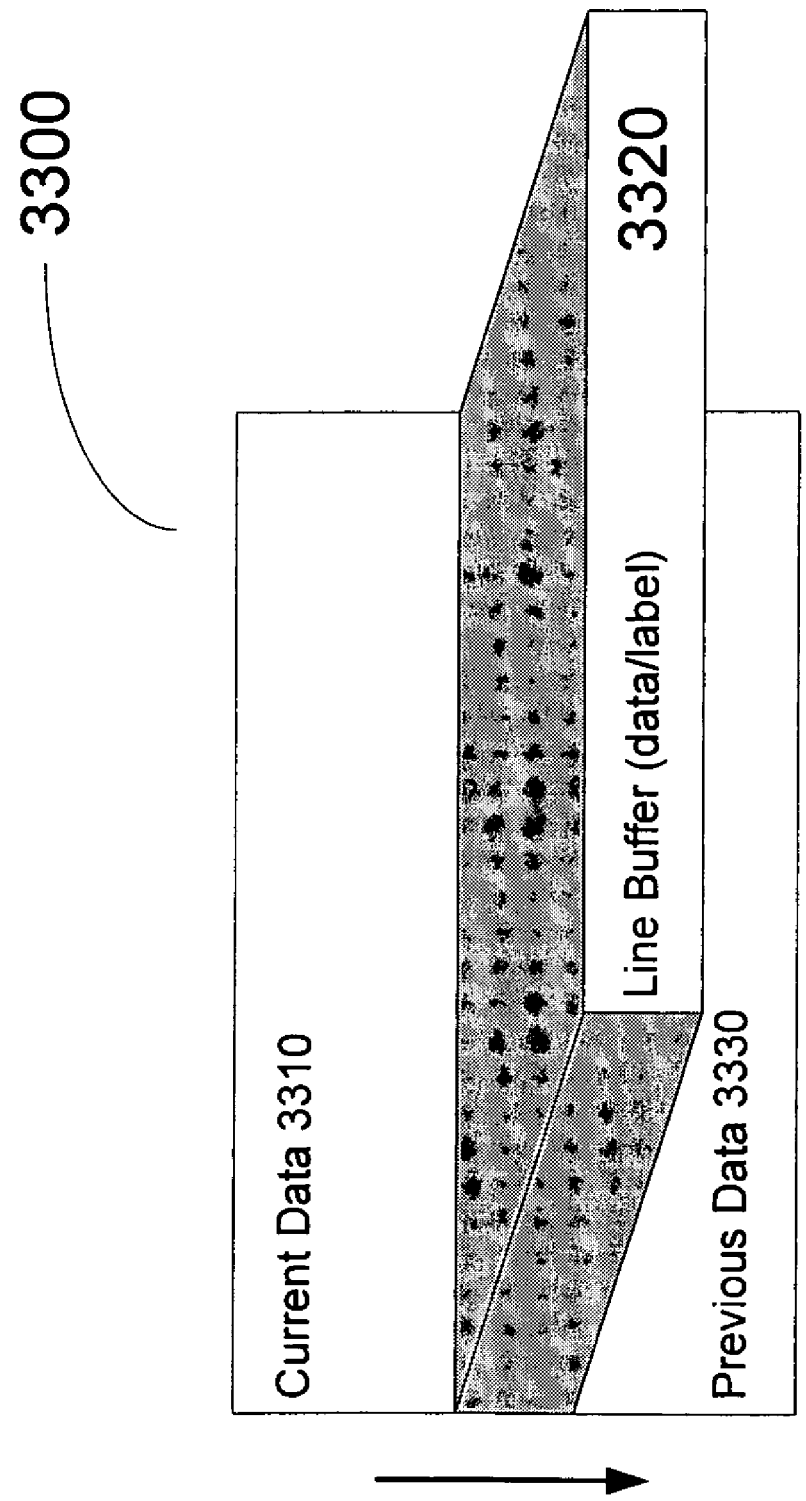
FIG. 33 is a diagram illustrating a frame buffer in accordance with an embodiment of the present invention.

Therefore only one buffer for the full data array is required, along with the line buffer which can be one or more lines in size. Referring to FIG. 33, frame buffer 3300, current data 3310, line buffer 3320 and previous data 3330 are illustrated. According to an embodiment, previous data 3330 is overwritten by the new data at the top of the line buffer 3320.

All of the functions described above can be linear and efficient in software and parallelizable for hardware for an embedded system.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

I claim:

1. A method for three dimensional connected component labeling, the method comprising:
   a. determining a location value for each of one or more labels, each location value identifying a maximum "y" extent and a maximum "z" extent of an associated label region;
   b. storing each of the one or more labels that refer to areas subsumed in a determination of the maximum y extent in the maximum "z" extent as a yzMax location value;
   c. buffering in a frame buffer the one or more of labels; and providing access via a three-dimensional kernel to one or more values in a current line buffer and/or a current array and/or a previous array.

2. The method of claim 1 further comprising: propagating each yzMax location value to propagate from root label to root label of each region such that each region root contains a yzMax value that is a function of (y, z) coordinates.

3. The method of claim 1 wherein the one or more location values are received from one or more raster-organized data arrays wherein the data is image data arranged to display an image.

4. The method of claim 1 wherein one or more region features are stored in a memory structure accessible by the line buffer to enable random access by the one or more labels according to the location values.

5. The method of claim 1 wherein the location values are stored in the memory structure to enable ordering the location values based on one or more of size and/or shape and/or time dimensions.

6. A computer program product comprising a non-transitory computer readable medium configured to perform one or more acts for performing three dimensional labeling of one or more labels the one or more acts comprising:
   a. one or more instructions for determining a location value for each of one or more labels, each location value identifying a maximum "y" extent and a maximum "z" extent of an associated label region;
   b. one or more instructions for storing each of the one or more labels that refer to areas subsumed in a determination of the maximum y extent and maximum z extent as a yzMax location value;
   c. one or more instructions for buffering in a frame buffer the one or more of labels; and
   d. one or more instructions for providing access via a three-dimensional kernel to one or more values in a current line buffer and/or a current array and/or a previous array.

7. The computer program product of claim 6 further comprising:
   one or more instructions for propagating each yzMax location value to propagate from root value to root value of each region such that each region root contains a yzMax value that is a function of (y, z) coordinates.

8. The computer program product of claim 6 wherein the one or more instructions for determining a location value for each of one or more labels, each location value identifying a maximum "y" extent and a maximum "z" extent of an associated label region includes receiving the location value from one or more raster-organized data arrays wherein the data is image data arranged to display an image.

9. The computer program product of claim 6 wherein the one or more instructions for providing access via a three-dimensional kernel to a position in a current line buffer and/or a current array and a previous array include: one or more instructions for storing one or more region features in a memory structure accessible by the line buffer to enable random access by the one or more labels according to the location values.

10. The computer program product of claim 6 wherein the one or more instructions for determining a location value for each of one or more labels, each location value identifying a maximum "y" extent and a maximum "z" extent of an associated label region include: one or more instructions for the location values are stored in the memory structure to enable ordering the location values based on one or more of size and/or shape and/or time dimensions.

11. A method for a three dimensional kernel for performing connected component labeling, the method comprising: accessing one or more values located in corresponding locations in a first two-dimensional array and a second two-dimensional array; performing kernel operations on one or more successive array locations in each of the first and second two-dimensional arrays; and comparing the one or more accessed values to determine one or more relationships for three-dimensional connected component labeling.

12. The method of claim 11 wherein the performing kernel operations includes designating no more than four locations arranged in three perpendicular directions about a center location to create the three dimension kernel; and moving the three-dimensional kernel over data in a single two-dimensional representation of the first and second two dimensional arrays.

13. The method of claim 11 wherein the performing kernel operations includes designating no more than four locations arranged in three perpendicular directions about a center location to create the three dimension kernel to create a minimum kernel capable of three dimensional connected component labeling using a single frame buffer and single line buffer.

14. The method of claim 13 wherein the three-dimensional kernel enables extending a third dimension indefinitely, wherein said extension of the third dimension is independent of requiring additional resources.

15. The method of claim 14 wherein the resources include one or more of processing, memory, power, and/or clocking requirements.

16. A computer program product comprising a non-transitory computer readable medium configured to perform one or more acts for a three dimensional kernel for three dimensional connected component labeling, the one or more acts comprising:
   a. one or more instructions for accessing one or more values located in corresponding locations in a first two-dimensional array and a second two-dimensional array;
   b. one or more instructions for performing kernel operations on one or more successive array locations in each of the first and second two-dimensional arrays; and
   c. one or more instructions for comparing the one or more accessed values to determine one or more relationships for three-dimensional connected component labeling.

17. The computer program product of claim 16 wherein the one or more instructions for performing kernel operations includes one or more instructions for designating no more than four locations arranged in three perpendicular directions about a center location to create the three dimension kernel; and one or instructions for moving the three-dimensional kernel over data in a single two-dimensional representation of the first and second two-dimensional arrays.

18. The computer program product of claim 16 wherein the one or more instructions for performing kernel operations includes one or more instructions for designating no more than four locations arranged in three perpendicular directions about a center location to create the three dimension kernel to create a minimum kernel capable of three dimensional connected component labeling using a single frame buffer and single line buffer.

19. The computer program product of claim 18 wherein the three-dimensional kernel enables one or more instructions for extending a third dimension indefinitely, wherein said extension of the third dimension is independent of requiring additional resources.

20. The computer program product of claim 19 wherein the resources include one or more of processing, memory, power, and/or clocking requirements.

* * * * *